United States Patent
Kumar et al.

(10) Patent No.: US 9,026,268 B2
(45) Date of Patent: May 5, 2015

(54) SYSTEM AND METHOD FOR COMMUNICATION AND CONTROL IN A VEHICLE SYSTEM

(71) Applicant: General Electric Company, Schenectady, NY (US)

(72) Inventors: Ajith Kuttannair Kumar, Erie, PA (US); Glenn Robert Shaffer, Erie, PA (US); Patricia Sue Lacy, Erie, PA (US); Vinaykanth V. Mudiam, Erie, PA (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 13/729,262

(22) Filed: Dec. 28, 2012

(65) Prior Publication Data

US 2014/0188306 A1    Jul. 3, 2014

(51) Int. Cl.
*G05D 1/00*    (2006.01)
*B61C 17/12*    (2006.01)

(52) U.S. Cl.
CPC ..................... *B61C 17/12* (2013.01)

(58) Field of Classification Search
CPC .... G05D 1/0274; G05D 1/0278; B61L 3/006; B61L 15/0027
USPC ............. 701/2, 19, 20, 22, 24, 104, 70, 34.4; 267/220, 64.27; 370/242, 254, 401
See application file for complete search history.

(56) References Cited

U.S. PATENT DOCUMENTS

| | | | |
|---|---|---|---|
| 5,950,967 A * | 9/1999 | Montgomery | 246/182 R |
| 6,691,957 B2 * | 2/2004 | Hess et al. | 246/186 |
| 7,038,597 B2 * | 5/2006 | Smith | 340/933 |
| 8,073,591 B2 * | 12/2011 | Bartling | 701/36 |
| 8,538,608 B2 * | 9/2013 | Meltser et al. | 701/19 |
| 2003/0034423 A1 * | 2/2003 | Hess et al. | 246/167 R |
| 2007/0297348 A1 * | 12/2007 | Trac et al. | 370/254 |
| 2008/0201028 A1 * | 8/2008 | Brooks et al. | 701/20 |
| 2008/0219274 A1 * | 9/2008 | Kato et al. | 370/401 |
| 2009/0254231 A1 * | 10/2009 | Bartling | 701/19 |
| 2010/0091663 A1 * | 4/2010 | Takeyama et al. | 370/242 |

* cited by examiner

*Primary Examiner* — Helal A Algahaim
*Assistant Examiner* — Shardul Patel
(74) *Attorney, Agent, or Firm* — GE Global Patent Operation; John A. Kramer

(57) ABSTRACT

A system is provided that includes a remote communication module, a control module, and a determination module. The remote communication module is configured to be disposed onboard a remote consist of a vehicle system, and is communicatively connected to at least one additional consist of the vehicle system. The control module is configured to be disposed onboard the remote consist and to provide control commands to at least one powered unit of the remote consist. The determination module is configured to be disposed onboard the remote consist and to determine capability information corresponding to the ability of the at least one powered unit of the remote consist to perform a first command received from one of the at least one additional consist. The determination module is also configured to determine a second command provided to the control module using the first command and the capability information.

30 Claims, 16 Drawing Sheets

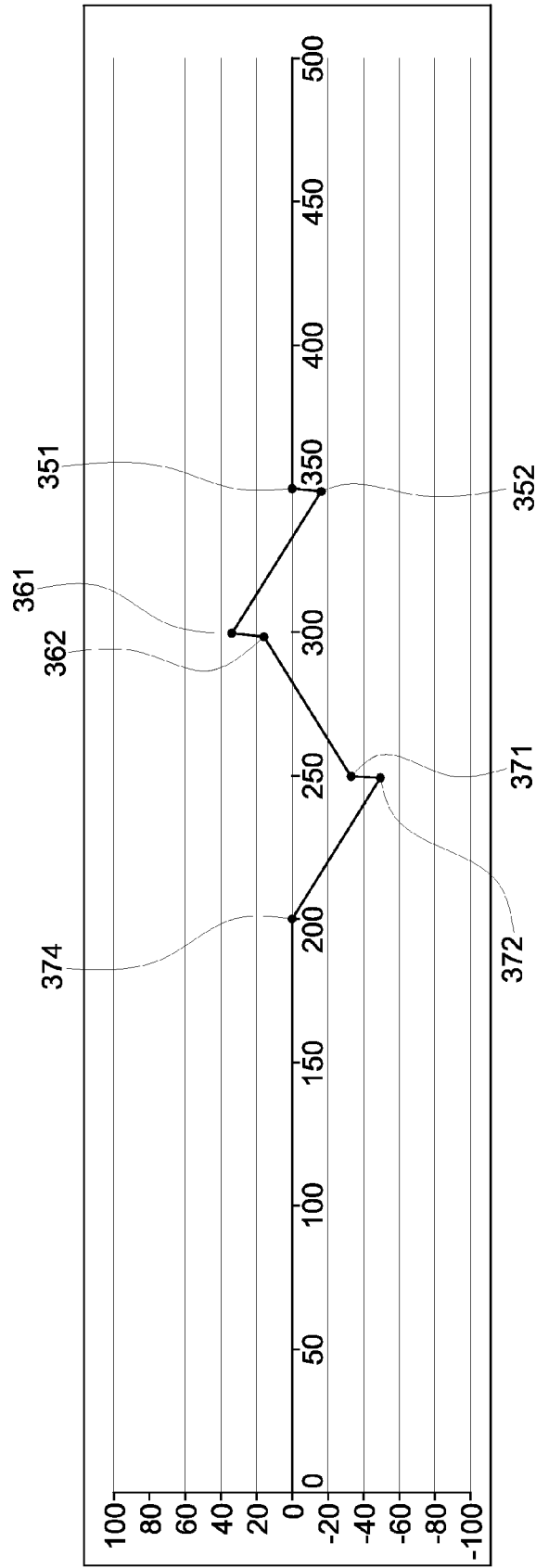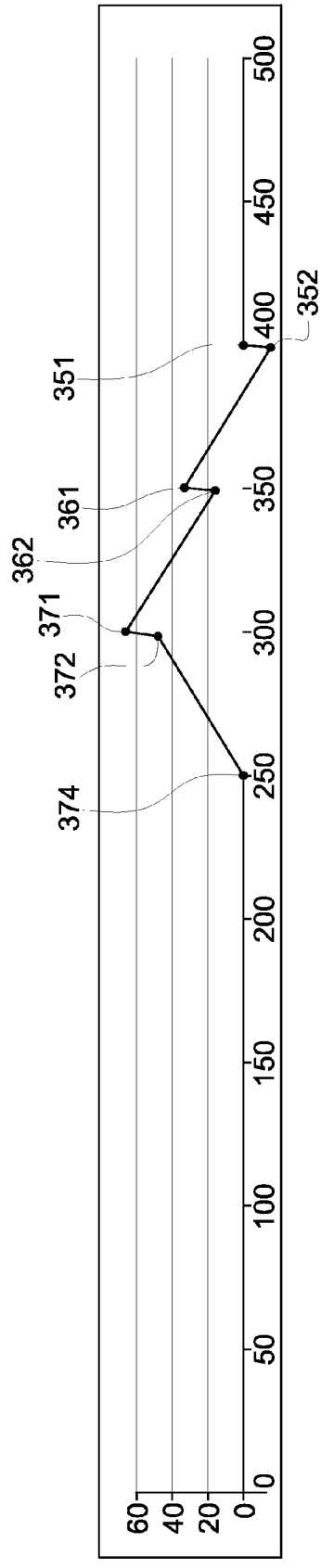
FIG. 3E
FIG. 3F

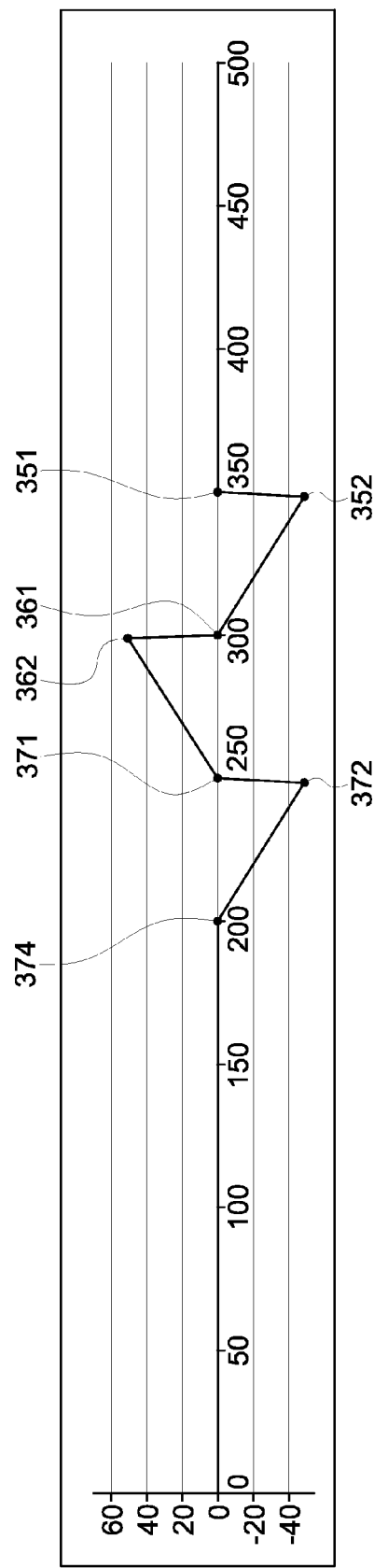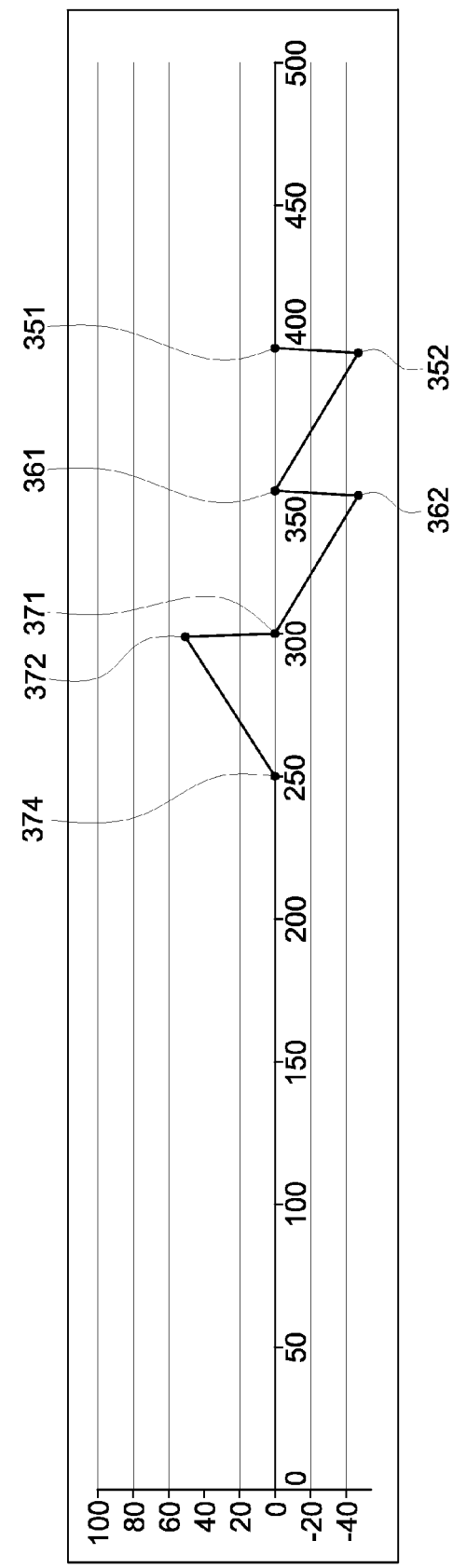
FIG. 4E
FIG. 4F

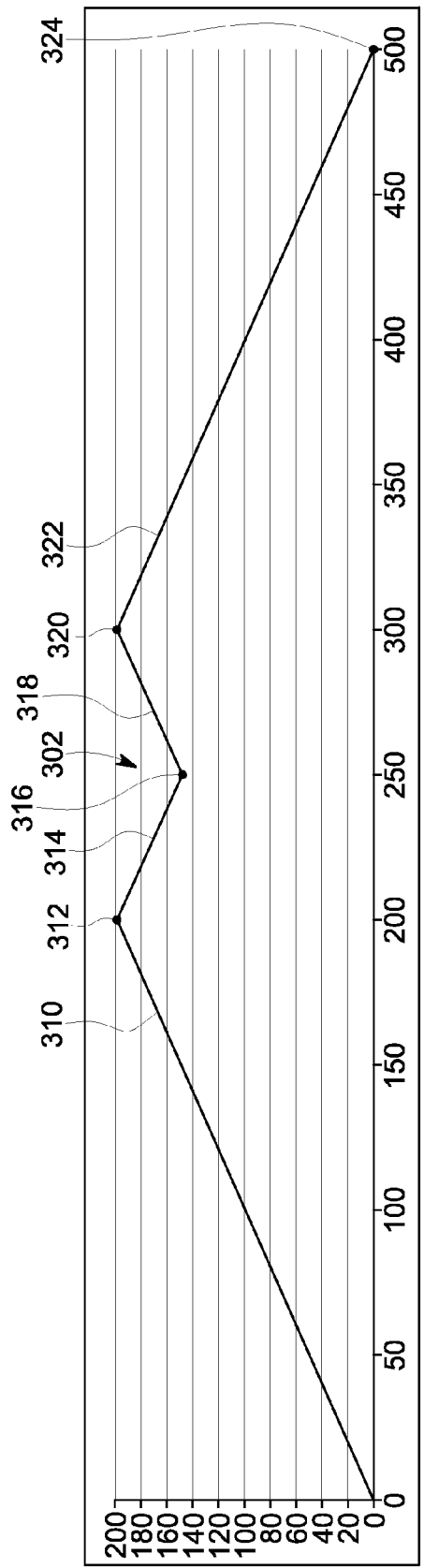
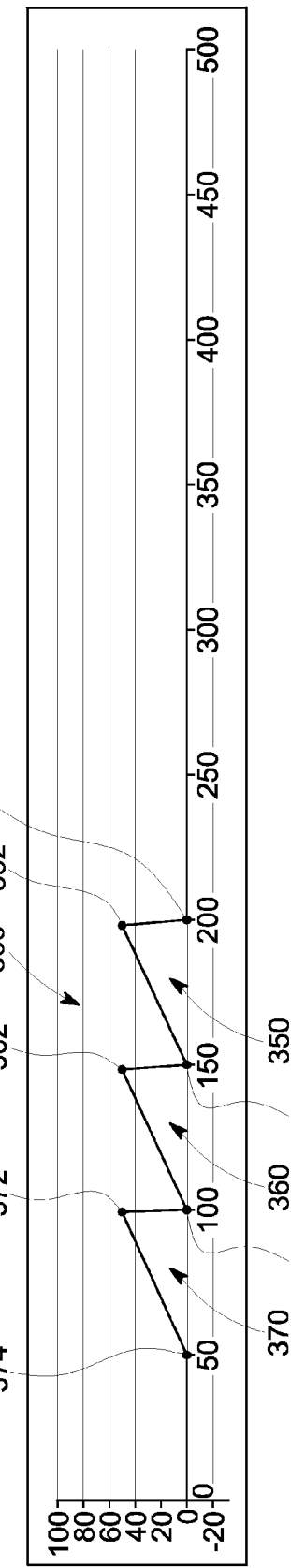
FIG. 5A
FIG. 5B

SYSTEM AND METHOD FOR COMMUNICATION AND CONTROL IN A VEHICLE SYSTEM

FIELD

Embodiments of the subject matter described herein relate to communication and control of plural powered units of a vehicle system

BACKGROUND

A vehicle system may include one or more powered vehicles that may be mechanically linked (directly or indirectly) to non-powered vehicles. The powered and non-powered vehicles of the vehicle system may travel as a group along a designated route. The powered vehicles may be organized into consists, with each consist including one or more powered vehicles. Non-powered vehicles may be interposed between the powered vehicles. For example, the powered vehicles of two neighboring consists may be separated by one or more non-powered vehicles.

The vehicle system may coordinate operations of the various consists to move the vehicle system. For example, a rail vehicle system may include a powered unit consist that has one or more powered units mechanically coupled to one or more rail cars. In certain conventionally known applications, a lead consist may control operation of one or more remote consists. More specifically, the lead consist (e.g., a vehicle such as a locomotive within the lead consist) may coordinate tractive and braking operations of the different consists (e.g., remote consists or vehicles such as locomotives making up such consists) to control movement of the rail vehicle system (e.g., a train). The consists may communicate with one another to coordinate tractive and braking operations of the train. For example, in certain conventional vehicle systems, a lead consist may provide command signals to and receive status signals from the remote consists via a distributed power (DP) arrangement. The remote consists may be linked with a lead consist via a wireless communication system, with the lead consist determining commands corresponding to tractive and/or braking efforts to be transmitted to all of the remote consists over a wireless communication system.

Current DP operation is generally achieved by an operator (e.g., an operator positioned onboard a powered vehicle of the lead consist) controlling remote consists synchronously. The information (e.g., control commands) are transmitted to the remote consists wirelessly, for example by radio messages. However, such radio messages are prone to errors. This is even more so as the length of the vehicle system increases. Eventually, for a given wireless system, a maximum length of vehicle system is reached at which point it becomes impractical or impossible for the lead consist to wirelessly communicate with one or more remote consists due to the distance between consists. Further, current DP operation also requires an operator to control multiple consists, or groups of vehicles. It may be difficult, even for an operator having skill and experience, to manage more than several consists at once. As the number of consists increases, it becomes impractical or impossible for an operator to individually control each of the consists.

These and other drawbacks of conventional communications and control systems of vehicle systems may result in poor performance, limited flexibility of control, limits on the length of a vehicle system, limits on the number of consists in a vehicle system, limits on hauleability of a vehicle system (e.g., limits on the amount of weight and/or freight that can be transported by the vehicle system), and the like.

BRIEF DESCRIPTION

In one embodiment a system is provided that includes a remote communication module, a control module, and a determination module. As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hardwired instructions, the software that directs hardware to perform the operations, or a combination thereof.

The remote communication module is configured to be disposed onboard a remote consist of a vehicle system, and is configured to communicate with at least one additional consist of the vehicle system. The control module is configured to be disposed onboard the remote consist and to provide control commands to at least one powered unit of the remote consist. The determination module is configured to be disposed onboard the remote consist and to determine capability information corresponding to the ability of the at least one powered unit of the remote consist to perform a first command received from one of the at least one additional consist. The determination module is also configured to determine a second command provided to the control module using the first command and the capability information, wherein the control module is configured to use the second command to control the at least one powered unit of the remote consist.

In another embodiment, a system includes a first communication module, a second communication module, a first control module, a second control module, and a determination module. The first communication module is configured to be disposed onboard a first consist of a vehicle system. The first control module is configured to be disposed onboard the first consist and to determine a first command. The second communication module is configured to be disposed onboard a second consist of a vehicle system. The second communication module is communicatively connected to the first communication module and configured to receive the first command from the first consist. The second control module is configured to be disposed onboard the second consist and to provide control commands to at least one powered unit of the second consist. The determination module is configured to be disposed onboard the second consist. The determination module is also configured to determine capability information corresponding to the ability of the at least one powered unit of the second consist to perform the first command. The determination module is further configured to determine a second command provided to the second control module using the first command and the capability information, wherein the second control module is configured to use the second command to control the at least one powered unit of the second consist.

In another embodiment, a method (e.g., a method for controlling operations of a vehicle system) is provided that includes determining, at a lead consist, a first command based on a desired operation of a vehicle system. The method also includes communicating the first command from the lead consist to a first remote consist. The first command may be communicated via a lead communication module disposed onboard the lead consist and a remote communication module disposed onboard the first remote consist of the vehicle system. The method also includes determining, at the first remote consist, capability information corresponding to the ability of the remote consist to perform the first command. Also, the method includes determining, at the first remote consist, a second command using the first command and the capability information. Further, the method includes operating the first remote consist pursuant to the second command.

In another embodiment, a method (e.g., a method for controlling operations of a vehicle system) is provided that includes determining, at a first remote consist of a vehicle system, capability information. The capability information corresponds to an ability of the remote consist to perform a first command received at the first remote consist from a lead consist of the vehicle system. The first command is determined based on a desired operation of the vehicle system. The method also includes, determining, at the first remote consists, a second command using the first command and the capability information. The method further includes operating the first remote consist pursuant to the second command.

BRIEF DESCRIPTION OF THE DRAWINGS

The inventive subject matter will be better understood from reading the following description of non-limiting embodiments, with reference to the attached drawings, wherein below:

FIGS. 3A-3G depict coupling forces within a vehicle system, according to an embodiment;

FIGS. 4A-4G depict coupling forces within a vehicle system, according to an embodiment;

FIGS. 5A-5G depict coupling forces within a vehicle system, according to an embodiment; and FIG. 6, comprising parts

DETAILED DESCRIPTION

Figure 1:
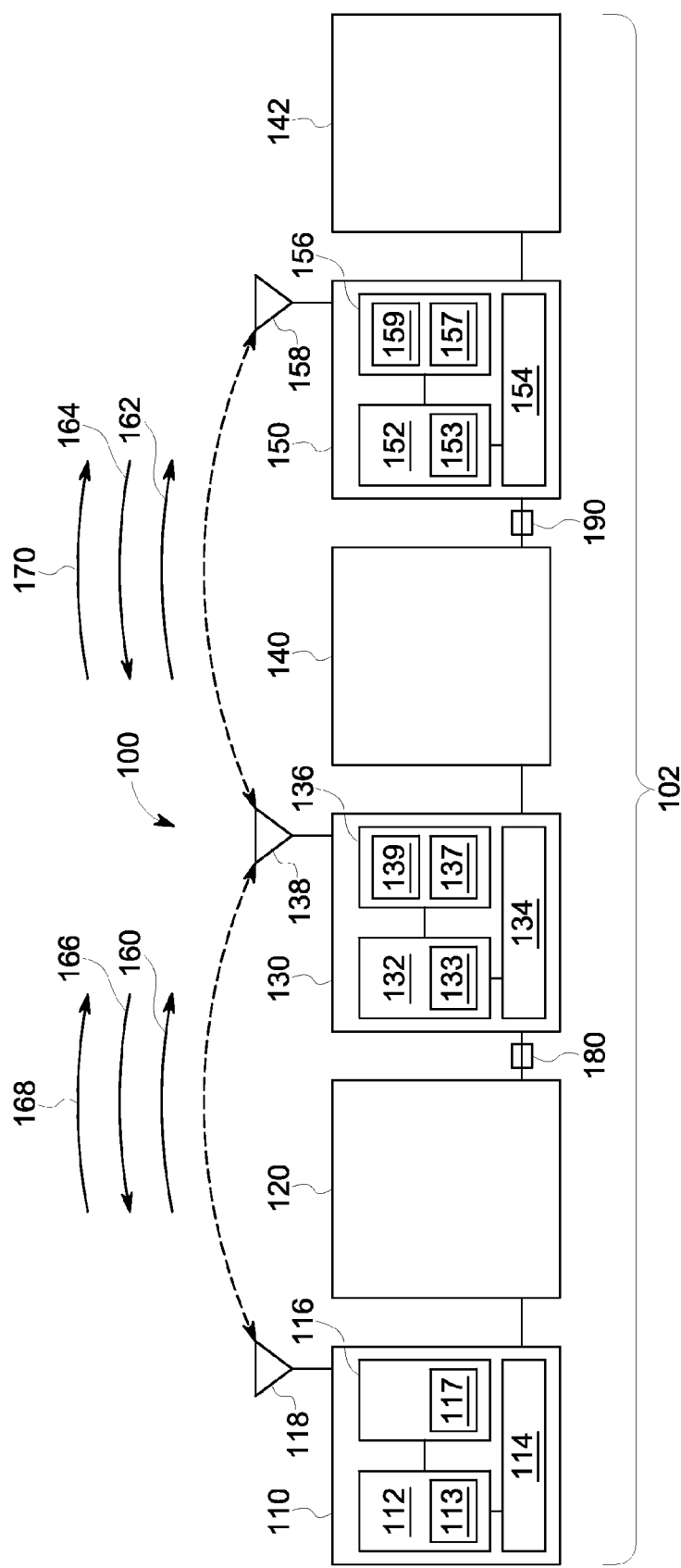
FIG. 1 is a schematic diagram of a communication and control system for a vehicle system, according to an embodiment.

Throughout this document, the term vehicle consist is used. A vehicle consist may be a group of two or more vehicles that are mechanically coupled to travel together along a route. Optionally, a vehicle consist may have a single propulsion-generating unit or vehicle. The vehicles in a vehicle consist can be propulsion-generating units (e.g., vehicles capable of generating propulsive force, which may be referred to as propulsion-generating units, powered units, or powered vehicles) that may be in succession and connected together so as to provide motoring and/or braking capability for the vehicle consist. The propulsion-generating units may be connected together with no other vehicles or cars between the propulsion-generating units. One example of a vehicle consist is a locomotive consist that includes locomotives as the propulsion-generating units. Other vehicles may be used instead of or in addition to locomotives to form the vehicle consist. For example, other off-highway vehicles (e.g., mining or other vehicles that are not designed and/or permitted to travel on public roads), automobiles, marine vessels, and the like, may be used as the propulsion-generating units described herein. A vehicle consist may also include non-propulsion generating units, such as where two or more propulsion-generating units are connected with each other by a non-propulsion-generating unit, such as a rail car, passenger car, or other vehicle that cannot generate propulsive force to propel the vehicle consist. A larger vehicle consist, such as a train, can have sub-consists. Specifically, there may be a lead consist (of propulsion-generating units), and one or more remote consists (of propulsion-generating units), such as midway in a line of cars and another remote consist at the end of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist. Various commands and information, including throttle and braking commands, along with other types of information such as an air brake command, engine shut down, motor cutout, dynamic brake grid cut out, or the like may be relayed or communicated between units of a consist.

As used herein, a remote powered unit is a powered unit that is operationally linked (e.g., wirelessly) with a separate (e.g., lead) powered unit of the vehicle system for coordinated tractive effort (e.g., throttle or braking), in a DP system. Typically, remote powered units are not in the same powered unit consist (e.g., locomotive consist) as the lead powered unit (e.g., a remote powered unit may be spaced apart from the lead consist by one or more non-powered units), but this is not necessarily the case. As used herein, a trail powered unit is one that is in the same powered unit consist as another powered unit, and that is controlled by the other powered unit, such as through a cable that interconnects the two (e.g., a multiple unit (MU) line).

One or more embodiments of the present inventive subject matter provide methods and systems for communicating data in a vehicle system. The vehicle system may include a plurality of vehicles that are mechanically coupled or linked together (directly or indirectly) and communicatively coupled to each other. Each of the vehicles may have a corresponding vehicle network. A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

In various embodiments of the present inventive subject matter, a first command corresponding to coordinated tractive effort of a vehicle system may be communicated from a lead consist to a remote consist (or a group of remote consists), with one or more other remote consists not receiving the first command from the lead consist. Instead, in some embodiments, one or more remote consists receive modified commands corresponding to coordinated tractive efforts of the vehicle system, and in turn may further modify the received modified commands. Thus, coordinated tractive effort information may communicated from a lead consist to only some of the consists (or only one neighboring remote consist). In some embodiments, each remote consist, other than a first remote consist, is configured to receive coordinated tractive effort information as modified or communicated from another remote consist. Thus, the distance a command message must be communicated (e.g., wirelessly) may be reduced. Further, improved fine tuning or adjustment of control based on capabilities or conditions local to a remote consist may be achieved by the remote consist.

In various embodiments, a vehicle system may effectively be broken into constituent consists with each consist having at least a degree of self-determination (e.g., ability to determine or adjust a control command for operation of the consist). In some embodiments, each consist may be configured to operate substantially autonomously, in that each consist (e.g., a lead unit of each consist) may internally determine the operations (e.g., throttle effort, braking effort, or the like) without influence of other consists, except for the reception of a reference speed. For example, a consist may receive a reference speed, and the consist may locally determine (e.g., onboard a lead powered unit of the consist) the tractive effort for the consist to apply, and/or a trim adjustment (e.g., a relatively small adjustment to a tractive effort or reference speed that may be performed for a relatively short duration) to be made based on a calculated, inferred, detected, or otherwise determined coupling force. In some embodiments, each consist may communicate commands or information related to consist operations (e.g., throttle effort, braking effort, reference speed, or the like), only with one or more neighboring or immediately adjacent consists. Thus, determination of the control of a particular consist (e.g., tractive efforts, braking efforts, or the like) may be made locally by the particular consist instead of globally at a single location for all consists of a vehicle system. The determination may be made locally without regard for some or all of the other consists of a vehicle system. In some embodiments, a coupling force between consists may be reduced or otherwise controlled by local (e.g., onboard a remote consist) determination or adjustment by a remote consist of a speed control, a position control, a force control, or the like. In some embodiments, a notch control scheme of throttle settings may be eliminated or reduced to achieve finer control resolution. In some embodiments, consists may be limited to communicating with immediately neighboring consists. Aspects of the inventive subject may be implemented on an entire vehicle system (e.g., all units of a vehicle system), or, in some embodiments, on a portion of a vehicle system (e.g., some but not all units of a vehicle system). Some embodiments discussed herein are configured to employ wireless communication; however, it may be noted that embodiments may also be utilized in the context of different types of communications, such as wired systems like train lines, Ethernet over multiple unit (eMU) communications, wired distributed power (DP) links, or the like.

At least one technical effect of various embodiments described herein may include improved fine tuning and individualization of control commands for one or more consists of a vehicle system. Another technical effect may include improved haulageability, for example, by enabling longer vehicle systems or vehicle systems with more consists. Another technical effect may include reduced drawbar forces. Another technical effect may include improved control of coupling forces, for example coupling forces between consists. Another technical effect may include improved adhesion or train handling.

FIG. 1 illustrates a schematic view of one embodiment of a communication and control system 100 for a vehicle system 102 having a first powered unit consist 110, a second powered unit consist 130, and a third powered unit consist 150. The communication and control system 100 may include various modules or systems disposed on one or more vehicles of the vehicle system 102. In the illustrated embodiment, the first powered unit consist 110 is a lead powered unit consist, and the second and third powered unit consists 130, 150 are remote powered unit consists. The first powered consist 110 is configured to coordinate, directly or indirectly, tractive efforts of the second and third powered unit consists 130, 150. For example, the first powered unit consist 110 may have a control module and/or operator disposed thereon that provides coordinated tractive effort commands to one or more remote consists to coordinate the tractive effort of the vehicle system 102. The various consists 110, 130, 150 are depicted for the sake of clarity and ease of explanation as single blocks in FIG. 1. In various embodiments, all or some of the consists 110, 130, 150 may include one or more powered units (e.g., locomotives). For example, a consist may include a lead powered unit and one or more trail powered units. Thus, an individual powered unit of the first consist 110 may be understood as a lead powered unit of the consist 110 as well as a lead powered unit of the vehicle system 102. As another example, in an example scenario in which the second consist 130 includes plural powered units, a particular powered unit of the second consist 130 that acts to provide control commands to other powered units (e.g., trail powered units of the consist 130) may be understood as a lead powered unit in the context of the second consist 130, as well as a remote powered unit receiving control from a lead powered unit of the first consist 110. The vehicle system 102 depicted in FIG. 1 includes non-powered units 120 that trail the powered units of the first consist 110. The non-powered units 120, which are pulled by the first consist 110 in the illustrated embodiment as the vehicle system 102 travels to the left in the sense of FIG. 1, may also be understood as being a part of the first consist 110. The vehicle system 102 also includes non-powered units 140 that trail the powered units of the second consist 130. The non-powered units 140, which are pulled by the second consist 130 in the illustrated embodiment as the vehicle system 102 travels to the left in the sense of FIG. 1, may also be understood as being a part of the second consist 130. The depicted vehicle system 102 further includes non-powered units 142 that trail the powered units of the third consist 150. The non-powered units 142, which are pulled by the third consist 150 in the illustrated embodiment as the vehicle system 102 travels to the left in the sense of FIG. 1, may also be understood as being a part of the third consist 150. Similar to the powered units, the non-powered units 120, 140, 142 are depicted for the sake of clarity and ease of explanation as single blocks. Varying numbers of non-powered units may be employed in various embodiments. In some embodiments, one or more non-powered units may be interposed between powered units of the same consist. As another example, in some embodiments, no non-powered units may be interposed between one or more immediately adjacent powered units of different consists.

The first consist 110 includes a control module 112, a propulsion module 114, a communication module 116, and an antenna 118. For ease of explanation, the first consist 110 may be discussed in the context of having a single powered vehicle, but in various embodiments the first consist 110 may include plural powered vehicles. The control module 112, which includes a memory 113 associated therewith, may be disposed on a powered unit of the first consist 110 (e.g., a lead powered unit of the first consist 110). The control module 112 is configured to develop control commands for the propulsion module 114 as well as other aspects of the vehicle system 102. For example, the control module 112 may have access to a variety of trip planning or profile information to develop a trip plan to achieve various objectives of a trip or mission. The control module 112 may use information such as mission objectives (e.g., objectives or schedules received from a scheduling or dispatch system), configuration information corresponding to the arrangement and type of vehicles in the vehicle system 102, or the like in developing a trip plan. The control module 112 develops commands for the propulsion module 114 of the first consist 110. The control module 112 also develops one or more commands for tractive efforts of other aspects of the vehicle system 102. The first command message, for example, may convey a desired speed, a throttle setting, a brake setting, or the like. Control commands from the control module 112 in some embodiments are configured to be performed autonomously by the propulsion module 114. In some embodiments, control commands from the control module 112 may be provided to an operator (e.g., via a screen or other display), and the operator may perform or implement the control commands.

The propulsion module 114 is configured to provide tractive efforts (e.g., throttle or braking) to the first consist 110 using control commands provided by the control module 112 and/or an operator. The propulsion module may include one or more of motors, drives, brakes (e.g., brakes of a regenerative braking system), wheels, and the like. Command messages received by the propulsion module 114 may include, for example, a throttle setting, a braking command (e.g., a percentage of available braking capacity), motor cutout, dynamic brake cut out, air brake setting or the like.

The communication module 116 is configured to communicate information to or from the first consist 110 with at least one other consist of the vehicle system 102. For example, the communication module 116 may communicate a control command to coordinate tractive efforts from the control module 112 of the first consist 110 to one or more other consists of the vehicle system 102. In the illustrated embodiment, the communication module 116 includes a memory 117 associated therewith, and is operably connected to an antenna 118. Thus, in the illustrated embodiment, the communication module 116 is configured for wireless communication, for example via radio signals.

The second consist 130 includes a control module 132, a propulsion module 134, a communication module 136, and an antenna 138. As with the first consist 110 of FIG. 1, for ease of explanation, the second consist 130 may be discussed in the context of having a single powered vehicle, but in various embodiments the second consist 130 may include plural powered vehicles. In the embodiment depicted in FIG. 1, the second consist 130 is a remote consist configured to receive control commands for coordinated tractive efforts with the first consist 110.

The control module 132, which includes a memory 133 associated therewith, may be disposed on a powered unit of the second consist 130 (e.g., a lead powered unit of the second consist 130). The control module 132 is configured to develop and/or provide control commands for the propulsion module 134. For example, the control module 132 may receive, via the communication module 136, a command message from the control module 112 of the first consist 110, or a modified command message based on a command message from the control module. The command message or modified command message may include a desired speed at which the second consist 130 is to travel. The control module 132 may then develop an appropriate command (e.g., a throttle setting) to achieve the desired speed. The control module 132, as one example, may provide the command to the propulsion module 134 such that the command is performed autonomously, or, as another example, may provide the command to an operator for implementation. As another example, the command message received by the control module 132 may include a throttle setting which the control module 132 provides to the propulsion module 134.

The propulsion module 134 is configured to provide tractive efforts (e.g., throttle or braking) to the second consist 130 using control commands provided by the control module 132 and/or an operator. The propulsion module 134 may include one or more of motors, drives, brakes (e.g., brakes of a regenerative braking system), wheels, or the like. Command messages received by the propulsion module 134 may include, for example, a throttle setting, a braking command (e.g., a percentage of available braking capacity), or the like.

In the illustrated embodiment, the communication module 136 of the second consist 130 is configured to communicate information to or from the first consist 110 and also to communicate information to or from the third consist 150. As the second consist 130 is configured as a remote consist in the illustrated embodiment, the communication module 136 of the second consist 130 may be understood to be a remote communication module. In some embodiments, the communication module 136 may be configured to receive a command message from the first consist 110 to coordinate tractive efforts of the vehicle system 102, to communicate capability information of the second consist 130 to the first consist 110, to communicate a command message to the third consist 150 to coordinate tractive efforts of the vehicle system 102, to receive capability information of the third consist 150, or the like. In the illustrated embodiment, the communication module 136 includes a memory 137 associated therewith, and is operably connected to an antenna 138. Thus, in the illustrated embodiment, the communication module 136 is configured for wireless communication, for example via radio signals. Additionally or alternatively, various communication modules (e.g., the communication module 112 of the first consist 110 and the communication module 136 of the second consist) may be joined by a hard-wired communication link, such as a train line, a multiple unit line (MU) (e.g., the communication modules may communicate via Ethernet over MU line (eMU)), or the like.

The communication module 136 of the second consist 130 also includes a determination module 139. In the illustrated embodiment, the determination module 139 is depicted as being a part of the communication module 136. In various embodiments, all or a portion of the determination module 139 may be configured as a stand-alone unit, or, as another example, may be incorporated as a portion of the control module 132. The determination module 139 is configured to determine capability information corresponding to the ability of the second consist 130 (e.g., one or more powered units of the second consist 130) to perform a first command (e.g., an operation or an objective specified by the first command) received from another consist (e.g., first consist 110), and to determine a second command provided to the control module 132 using the first command and the capability information.

In one example scenario, the control module 112 of the first consist 110 may determine, using information describing the configuration or makeup of the vehicle system 102 as well as mission objectives, a desired speed of the vehicle system 102, and develop a first command to achieve the desired speed. For example, the control module 112 may determine that the first consist 110 and the second consist 130 should travel at about 50 miles per hour (mph) (or about 80 kilometers per hour (kph)). A control message is then sent, from the communication module 116 of the first consist 110, to the communication module 136 of the second consist 130, including command information corresponding to a speed of 50 mph. The determination module 139 of the second consist 130 is configured to determine if the second consist 130 is capable of self-propulsion at 50 mph. If the second consist 130 is capable of the 50 mph, a command message may be provided to the control module 132 from the communication module 136 of the second consist 130 directing the control module 132 to direct the propulsion module 134 to propel the second consist 130 at 50 mph. For example, in some embodiments, the control module 132 may determine an appropriate throttle setting based on a desired speed (e.g., 50 mph). However, if the determination module 139 determines that the second consist 130 is not capable of performing the desired operation (e.g., throttle setting corresponding to 50 mph), then the determination module 139 may determine an appropriate speed that the second consist 130 may achieve. The determination module 139 may then send, via the communication modules 136, 116 capability information to the first consist 110 informing the first consist 110 (e.g., the control module 112) of the speed at which the second consist 130 is capable of traveling. The control module 112 may then modify a trip plan, control commands, or the like responsive to the received capability information. Further, the determination module 139 may determine a second command corresponding to the achievable speed. For example, if the achievable speed is 45 mph (or about 72 kph), the determination module 139 may (in addition to informing the first consist 110 that the achievable speed of the second consist 130 is 45 mph), provide a command message to the control module 132 of the second consist 130 to direct the propulsion module 134 to propel the second consist 130 at 45 mph. The control module 132 may determine a corresponding throttle setting corresponding to the 45 mph speed, and provide the throttle setting to the propulsion module 134. The second consist 130 may also provide a command message corresponding to the second command (e.g., travel at 45 mph) to one or more other consists of the vehicle system (e.g., third consist 150). The above scenario is meant by way of illustration and example. Additional or alternative speeds, operations, settings, commands, or the like may be used in other embodiments.

In some embodiments, the determination module 139 may also use coupling information to determine the second command. For example, the determination module 139 may be configured to calculate, infer, or determine an expected coupling force using parameters corresponding to the consist or the terrain. In embodiments, the expected coupling force corresponds to the coupling force anticipated or estimated between adjacent consists if the consists are each operated at tractive efforts corresponding to an identical reference speed. The determination module 139 may use a consist tonnage, weight, terrain information (e.g., information describing or corresponding to a grade being traversed or to be traversed by one or more consists), or the like. For example, the determination module 139 may determine a throttle setting (or brake setting) required to move a consist of a given size up (or down) a grade at a given reference speed. More tractive effort may be required when the consist is moving up a grade, while less tractive effort (or increased braking effort) may be required when the consist is moving down a grade. In some embodiments, a grade being traversed by a consist may be compared with a grade being traversed by a neighboring consist to estimate a coupling force between the consist and the neighboring consist.

In some embodiments, the coupling information may include measured or detected information. For example, the determination module 139 may use information regarding a detected coupling force or displacement to determine the second command. As another example, the determination module 139 may use coupling information including displacement information (e.g., a change in the length of a vehicle system) to determine whether vehicles of a consist are under tension (e.g., the length is above a reference value) or under compression (e.g., the length is below a reference value). In one example scenario, the determination module 139 may determine that the second consist 130 is capable of a speed called for by a first command provided by the first consist 110. However, the determination module 139 may receive information that a detected coupling force (e.g., a coupling force between the first consist 110 and the second consist 130) has a larger tensile force than desired. The second determination module 139 may then modify the desired speed (or throttle setting) provided by the first consist 110 so that the second consist 130 travels slightly faster (or at a higher throttle setting) than called for by the first command to reduce the tensile force between the first consist 110 and the second consist 130. For example, if the first command calls for a speed of 50 mph, and the second consist 130 is capable of 50 mph, the second determination module may then determine a second command corresponding to a speed of 50.1 mph that is provided to the control module 132 of the second consist 130.

In another example scenario, the determination module 139 may similarly determine that the second consist 130 is capable of a speed called for by a first command provided by the first consist 110. However, the determination module 139 may receive information that a detected coupling force (e.g., a coupling force between the first consist 110 and the second consist 130) has a larger compression force than desired. The second determination module 139 may then modify the desired speed provided by the first consist 110 (or throttle setting corresponding to the desired speed) so that the second consist 130 travels slightly slower (or at a lower throttle setting) than called by for the first command to reduce the compression force between the first consist 110 and the second consist 130. For example, if the first command calls for a speed of 50 mph, and the second consist 130 is capable of 50 mph, the second determination module may then determine a second command (e.g., a throttle setting) corresponding to a speed of 49.9 mph that is provided to the control module 132 of the second consist 130. In some embodiments, a braking command may be modified based on a compression or tensile coupling force. In still other embodiments, displacement or positioning information (e.g. a change in length, a length of stretch of one or more coupling members, a length of compression of one or more coupling members, or the like) may be used additionally or alternatively by the determination module 139 of the second consist 130 to determine a modification to a command received from the first consist 110.

It may be noted that adjustments made to operate a consist above or below a reference speed may be made for varying lengths of time. In one example scenario, the determination module 139 may receive a reference speed from the first consist 110, where the reference speed corresponds to a desired overall speed for the vehicle system 102 for a given duration. The determination module 139 (and/or other module of the second consist 130 such as the control module 132) may then determine the required throttle setting for the second consist to achieve the reference speed. The determination module 139 may then also determine whether a trim adjustment is appropriate based on a coupling force. The coupling force may be inferred or calculated using, for example, information describing the consist and/or the train. The trim adjustment, for example, may alter the reference speed (or corresponding required tractive effort) a relatively small amount for a relatively short duration. For example, with a reference speed of about 40 mph, if the determination module 139 determines that a compressive coupling force between the first consist 110 and the second consist 130 should be counteracted, the reference speed (or corresponding throttle setting) for the second consist 130 may be decreased, for example, by about 0.1 mph until the compressive force has been sufficiently addressed. The length of time a given trim adjustment is applied may be relatively short compared to the length of time of a mission of the vehicle system 102. For example, a given trim adjustment may be applied for about a minute or less in some circumstances. In some embodiments, trim adjustments may be configured to be applied for durations ranging from above a minute to below a second.

It should also be noted that the reference speed (e.g., a reference speed provided from one consist to another consist), may be an instantaneous speed in some embodiments, and may correspond to a speed to be performed for a given duration in some embodiments. For example, a reference speed may be designed for a period of time such as about twenty seconds, about thirty seconds, or the like. To the extent a trim adjustment is necessary or desired, the trim adjustment may be performed for the entirety of the reference speed duration, or for only a portion of the reference speed duration, as appropriate under the circumstances.

In the illustrated embodiment, the vehicle system 102 includes a coupling detection unit 180 positioned proximate the second consist 130. For example, the coupling detection unit 180 may be a force sensor, such as a force sensor positioned proximate to a drawbar, that is configured to determine a coupling force associated with the second consist 130 (e.g., a coupling force between a lead powered unit of the second consist 130 and the first consist 110). In other embodiments, the coupling detection unit 180 may be configured to detect displacement information such as an amount of stretch or strain of a coupling member associated with the second consist 130, an amount of compression of a coupling member, or the like. In still other embodiments, the coupling detection unit 180 may include a positioning detector, such as a global positioning system (GPS) detector that detects a distance or a change in distance between two units of the vehicle system 102. In still other embodiments, the coupling detection unit 180 may be configured to detect displacement information corresponding to the entire vehicle system 102 or a group of units of the vehicle system 102. For example, the change in position or displacement between two immediately adjacent units may not be very large, but the cumulative stretch (or compression) of all the units of the vehicle system 102 may be substantially more appreciable and thus easier to measure. Thus a total change in position information (e.g. a change in length of the entire vehicle system 102, or, as another example, a change in length of a consist or other group of vehicles of which the vehicle system 102 is comprised) may be used. The coupling detection unit 180 is operably connected to the determination module 139 and is configured to provide the determination module 139 with coupling information that the determination module 139 may utilize to determine a second command for controlling the second consist 130. Thus, the determination module 139 may determine a second command for controlling the second consist 130 using a first command provided by the first consist 110, capability information corresponding to the capability of the second consist 130 to perform the first command, and coupling information. In still other embodiments, the determination module 139 may utilize, additionally or alternatively, terrain information. For example, the determination module 139 may modify the first command based on a slope of a grade over which the second consist 130 is traversing.

The third consist 150 includes a control module 152, a propulsion module 154, a communication module 156, and an antenna 158. As with the first consist 110 and the second consist 130 of FIG. 1, for ease of explanation, the third consist 150 may be discussed in the context of having a single powered vehicle, but in various embodiments the third consist 150 may include plural powered vehicles. The third consist 150 may be configured generally similar to the second consist 130 in various respects. For example, in the embodiment depicted in FIG. 1, the third consist 150 is a remote consist configured to receive control commands for coordinated tractive efforts with the first consist 110. However, as discussed below, the third consist 150 may not be configured to receive the control command(s) for coordinated tractive efforts with other aspects of the vehicle system 102 from the first consist. Instead, the third consist 150 is configured to receive a control command for coordinated tractive efforts of the vehicle system 102 from the second consist 130. The control command received by the third consist 150 from the second consist 130 may be modified from a control command received by the second consist 130 from the first consist 110. Further, the third consist 150 may be configured to modify the control command received from the second consist 130 using capability information corresponding to the capability of the third consist 150 to perform the control command provided by the second consist 130 and/or coupling information and/or terrain information. Further still, the third consist 150 may provide a control command to one or more additional consists (e.g., located behind the third consist 150 in the direction of travel) (not shown in FIG. 1).

The control module 152, which includes a memory 153 associated therewith, may be disposed on a powered unit of the third consist 150 (e.g., a lead powered unit of the third consist 150). The control module 152 is configured to develop and/or provide control commands for the propulsion module 154. For example, the control module 152 may receive, from the communication module 156, a command message from the control module 132 of the second consist 130, or a modified command message based on a command message from the control module 130. The command message may include a desired speed at which the third consist 150 is to travel. The control module 152 may then develop an appropriate command (e.g., a throttle setting) to achieve the desired speed. As another example, the command message received by the control module 152 may include a throttle setting which the control module 152 provides to the propulsion module 154.

The propulsion module 154 is configured to provide tractive efforts (e.g., throttle or braking) to the third consist 150 using control commands provided by the control module 152 and/or an operator. The propulsion module 154 may include one or more of motors, drives, brakes (e.g., brakes of a regenerative braking system), wheels, or the like. Command messages received by the propulsion module 154 may include, for example, a throttle setting, a braking command (e.g., a percentage of available braking capacity), or the like.

In the illustrated embodiment, the communication module 156 of the third consist 150 is configured to communicate information to or from the second consist 130 (e.g., a control command for coordinating tractive efforts received from the second consist 130, capability information of the third consist 150 sent to the second consist 130, or the like), but not to communicate directly with the communication module 116 of the first consist 110. In some embodiments, information other than control commands for coordinating tractive efforts and capability information may be communicated between the first consist 110 and the third consist 150. Like the second consist 130, the third consist 150 is configured as a remote consist in the illustrated embodiment, and the communication module 156 of the third consist 150 may be understood to be a remote communication module. In some embodiments, the communication module 156 may be configured to receive a command message from the second consist 130 including a control command to coordinate tractive efforts of the vehicle system 102 (e.g., to coordinate tractive efforts of the third consist 150 with the second consist 130) and to communicate capability information of the third consist 150 to the second consist 130, or the like. In the illustrated embodiment, the communication module 156 includes a memory 157 associated therewith, and is operably connected to an antenna 158. Thus, in the illustrated embodiment, the communication module 156 is configured for wireless communication, for example via radio signals.

The communication module 156 of the third consist 150 also includes a determination module 159. The determination module 159 may be configured generally similarly to the determination module 139 discussed above in connection with the second consist 130. For example, the determination module 159 may be configured to determine capability information corresponding to the ability of the third consist 150 (e.g., one or more powered units of the third consist 150) to perform a received command (e.g., an operation or an objective specified by a command message) received from another consist (e.g., second consist 130), and to determine a modified command provided to the control module 152 using the received command and the capability information. The determination module 159 may also use coupling information (e.g., provided by a coupling detection unit 190 that is substantially similar in many respects to the coupling detection unit 180 discussed above) and/or terrain information to determine a modified command using a received command. For example, if information from the coupling detection unit 190 that indicates a coupling force between the second consist 130 and the third consist 150 has an amount of tension above a desired level or outside of a permissible range, the determination module 159 may modify a received command to operate the third consist 150 at a higher throttle setting than called for the received command. The third consist 150 may then provide the modified command to a fourth consist (not shown). Thus, in some embodiments, in contrast to conventional systems that utilize a lead consist to provide control commands for coordinated tractive efforts to each consist of a vehicle system, each consist may receive a control command from another consist (e.g., a preceding consist in the direction of travel) and/or provide a control command (in some circumstances, a modified control command) to another consist (e.g., a following consist in the direction of travel). Thus, in some embodiments, consists are arranged sequentially, with each consist acting similarly to a lead consist in at least some respects with respect to an immediately following consist, and/or with each consist configured to modify a received command from another consist, as appropriate (based, for example, on capability information and/or coupling information).

Thus, in some embodiments, a lead consist may provide commands for coordinating tractive efforts to less than all of the remote consists of a vehicle system. In some embodiments, the lead consist may provide control commands for coordinating tractive efforts with the lead consist directly to only a single remote consist. The remote consist that receives the control commands may be the consist nearest the lead consist. The remote consist may then provide a control command for coordinated tractive efforts (which may be modified from the control command received from the first consist) to one or more additional remote consists, which may also provide a control command (that may be further modified) to one or more still further additional remote consists, and so on. In some embodiments, the lead consist may provide control commands to a group of remote consists, which in turn provide control commands (which may be modified from the control command sent by the lead consist) to additional remote consists.

As discussed above, in conventional DP systems, a lead control module (e.g., a control module of a lead consist) provides specific control commands (e.g., a throttle notch setting) to be followed by each and every remote consist. In contrast, in the illustrated embodiment, the control module 112 of the first consist 110 communicates a first command indicating a desired operation (e.g., speed) of the remote consists (e.g., second consist 130), with the second consist 130 determining if the second consist 130 may perform the desired operation and/or modifying the desired operation to develop a second command. The second command may be provided to the propulsion system of the second consist 130 and/or provided to the third consist 150. The third consist 150, in turn, may determine if the third consist 150 may perform the operation specified by the second command, and/or modify the desired operation of the second command to form a third command. The third command may be provided to the propulsion module of the third consist 150 and/or to one or more additional consists of the vehicle system 102. Thus, some embodiments provide de-centralization of a determination of the precise command (or commands) given to each consist, allowing for longer vehicle systems (for example, alleviating the need for command messages to be sent the length of the train and/or avoiding or reducing complications of repeated command messages) as well as improving ability to quickly adjust to local conditions of a given remote consist (e.g., a capability of the remote consist and/or coupling information associated with the remote consist).

With continued reference to FIG. 1, examples of communications between the various consists of the vehicle system 102 will be discussed. In one example scenario, the control module 112 of the first consist 110 determines a desired operation or performance of a task to accomplish a mission. For example, the control module 112 may develop a series of commands configured to control tractive efforts of the vehicle system 102 to perform a mission, using, for example, information describing specific objectives or parameters of the mission (e.g., an estimated time of arrival, a route to be traversed, or the like), as well as information about the vehicle system 102 (e.g., the number, type, arrangement, or the like of the individual units that form the vehicle system 102). For example, for a given portion of the trip or mission, the control module 112 may determine that a speed of about 40 mph (or about 64 kilometers per hour (kph)) is appropriate.

The first control module 112 may then provide a first command message 160 indicating a desired, or reference speed (e.g., about 40 mph) to the communication module 116, which provides the command message to the communication module 136 of the second consist. The determination module 139 may then determine if the second consist 130 has the capability to comply with the desired speed. The determination module 139 may also determine whether or not to adjust the reference speed, for example, based on coupling information. The determination module 139 may then determine a second command message 162 that may be modified as discussed above from the first command message 160 (e.g., including a reference speed of the second consist 130 that differs from the reference speed provided by the first consist 110). The second command message 162 is then provided to the communication module 156 of the third consist 150.

The determination module 159 of the third consist 150 may then determine the capability of the third consist 150 to comply with the second command message 162 (e.g., the ability of the third consist 150 to perform an operation or achieve a speed indicated by the second command message 162) capability. Based on the capability of the third consist 150 to perform the indicated operation, the determination module 159 develops a capability message 164 which is communicated to the communication module 136 of the second consist 130. The capability message 164 may include information describing whether or not the third consist 150 is capable of performing pursuant to the second command 162 and, if not, a maximum permissible capability (e.g., speed) of the third consist 150. In some embodiments, the determination module 139 of the second consist is configured to analyze the capability information 164 provided by the third consist 150, and to determine an aggregate capability. For example, the aggregate capability may be described as the lowest speed of the potential speeds of the second consist 130 and the third consist 150. The communication module 136 of the second consist 130 then sends capability information 166 (e.g., information corresponding to the aggregate capability of the remote consists of the vehicle system 102) to the communication module 116 of the first consist 110. The communication module 116 may provide the capability information 166 to the control module 112 which may then develop a command message 168 that accounts for the aggregate capability of the remote consists.

The command message 168 may then be provided to the second consist 130. The determination module 139 of the second consist 130 may then modify the command message 168 based on coupling information to determine a command message 170. The command message 170 may then be used to control the operation (e.g., tractive efforts) of the second consist, and also be provided to the third consist 150. The determination module 159 of the third consist 150 may then modify the command message 170 provided by the second consist 130 using coupling information. Tractive efforts of the third consist 150 may then be controlled using the modified command message.

For instance, in one example scenario, the control module 112 determines a reference speed of about 40 mph (about 64 kph). The first consist 110 then communicates a command message 160 including the 40 mph reference speed to the second consist 130. In the example scenario, the second consist 130 is capable of achieving the 40 mph reference speed, and the second consist 130 thus sends a command message 162 including the 40 mph reference speed to the third consist 150. However, in the example scenario, the third consist 150 is only capable of traveling about 30 mph (about 48 kph). The third consist 150 thus sends capability information 164 to the second consist 130 including information corresponding to a 30 mph capability of the third consist 150. The second consist 130 then determines an aggregate capability of about 30 mph (the lower of the capabilities of the second consist 130 and the third consist 140). The second consist 130 then transmits capability information 166 (e.g., information including the aggregate capability of about 30 mph) to the first consist 110. Using the aggregate capability, the first consist 110 (e.g., the control module 112) develops a new reference speed (e.g., 30 mph) and adjusts any corresponding trip plan accordingly. The first consist 110 then transmits a command message 168 directing the second consist 130 to travel at 30 mph. The second consist 130, however, based on coupling information, may modify the reference speed to about 29.9 mph. The second consist then provides a command message 170 to the third consist 150 directing the third consist to use a reference speed of 29.9 mph. As with the second consist 130, the third consist 150 may revise the 29.9 mph reference speed provided via the command message 170 using coupling information, as appropriate. Thus, in some example scenarios, a remote consist may operate pursuant to a reference speed provided by a lead or other consist and transmit the reference speed to still another consist. Further, in some example scenarios, the remote consist may autonomously modify the reference speed to control the operation of the remote consist and transmit the modified reference speed to still another consist.

Embodiments described herein thus may provide advantages when compared to conventional DP systems. Such advantages may become even more pronounced as the length of a vehicle system and/or the numbers of consists in a vehicle system increase. For example, a large number of consists may become too complicated to track and control from a single centralized control location. As another example, practical limits (e.g., limits of wireless communication) may limit the length that communications may be sent. In some embodiments, the tractive efforts of a vehicle system having plural consists may be effectively controlled pursuant to a desired operation (e.g., a reference speed) specified by a first or lead consist without requiring the first or lead consist to communicate directly with each and every consist of the vehicle system. Embodiments allow decentralized modification of received commands as appropriate (e.g., remote consists may modify a command according to capabilities or conditions experienced by the remote consists).

Figure 2:
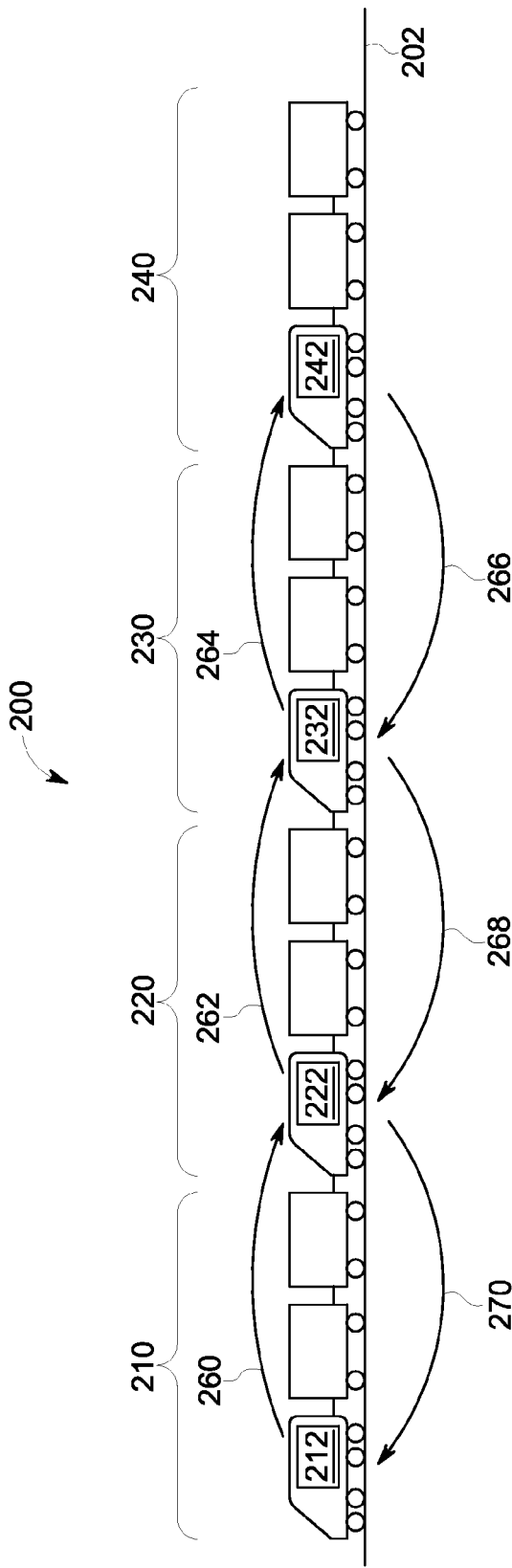
FIG. 2 is a schematic diagram of a vehicle system, according to an embodiment.

FIG. 2 depicts a vehicle system 200 including a lead consist 210, a first remote consist 220, a second remote consist 230, and a third remote consist 240. In the illustrated embodiment, the vehicle system 200 is configured as a rail vehicle system (e.g., train) traversing a route 202 (e.g., track). Each of the illustrated consists includes a single powered unit (e.g. locomotive) and two non-powered units for simplicity of illustration. However, in other embodiments, various numbers of units, numbers of consists, or arrangements may be employed. In the illustrated embodiments, each of the lead consist 210, the first remote consist 220, the second remote consist 230, and the third remote consist 240 include a respective control module 212, 222, 232, 242 disposed onboard a powered unit of the corresponding consist. Each of the control modules 212, 222, 232, 242 may be configured to perform some or all of the operations discussed above performed by the various control and communication modules.

The vehicle system 200 of FIG. 2 provides an example of a vehicle system where each consist is configured to communicate commands or other information regarding coordinated tractive efforts of the vehicle system only to immediately neighboring consists. In the embodiment depicted in FIG. 2, the lead consist 210 communicates regarding coordinated tractive efforts of the vehicle system 200 only with the first remote consist 220, the first remote consist 220 only with the lead consist 210 and the second remote consist 230, the second remote consist 230 only with the first remote consist 220 and the third remote consist 240, and the third remote consist 240 only with the second remote consist 230. In other embodiments, one or more consists may communicate coordinated tractive effort commands or information with more than one other consist but less than all consists of a vehicle system. Further, in some embodiments, additional information (such as an alarm information, status information, or the like) may be communicated between some or all of the consists.

In the illustrated embodiment, the control module 212 of the lead consist 210 may determine a reference speed that is communicated within a message 260 to the second consists 220. The first remote consist 220 may then determine a reference speed that may be modified, for example, using coupling information and/or capability information of the first remote consist 220, and communicate the modified reference speed to the second remote consist 230 within a message 262. Similarly, the second remote consist 230 may then determine a reference speed that may be modified, for example, using coupling information and/or capability information of the second consist 230, and communicate the modified reference speed to the third remote consist 240 within a message 264. The third remote consist 240 may then determine a capability of the third remote consist 240 to achieve the reference speed indicated by the message 264.

The third remote consist 240 may then communicate capability information within a message 266 corresponding to the ability of the third remote consist 240 to achieve the reference speed provided by the second remote consist 230. Further, the second remote consist 240 may develop a message 268 that corresponds to the aggregate capability of the second and third remote consists 230, 240, and communicate the message 268 to the first remote consist 220. Further, the first remote consist may develop a message 270 that corresponds to the aggregate capability of the first and second remote consists 220, 230 (and thus also the third remote consist 240), and communicate the message 270 to the lead consist 110, where the control module 212 may develop a revised reference speed.

Thus, the lead consist 210 may operate using capability or limit information provided from each consist of the vehicle system, including itself. Further, each remote consist 220, 230, 240, may operate using capability or limit information corresponding to its own capability as well as the capability of each (if any) trailing consist (in the direction of travel).

Also, each remote consist 220, 230, 240 is configured to receive a reference speed from a preceding (in the direction of travel) consist, to modify the reference speed as appropriate, and to provide the modified reference speed to a trailing (in the direction of travel) consist (if any). In other embodiments, the lead consist need not necessarily be positioned forward of all other consists in the direction of travel, and thus consists are not limited in terms of content of communication by the direction of travel in various embodiments. For example, in embodiments where a lead consist is positioned in an intermediate location along the length of a vehicle system, the lead consist may communicate a reference speed to the consist immediately preceding and to the consist immediately following the lead consist. Each of the nearest remote consists may then communicate reference speed outward along the length of the consist to an immediately neighboring consist, and so on.

As indicated above, coupling information, (e.g., coupling forces) may be detected and used to modify a reference speed (or other command or operation) of a vehicle system. For example, speeds of various consists may be controlled or varied to reduce a coupling force, to maintain a coupling force within a desired range, or the like. FIGS. 3-5 (comprising parts FIGS. 3A-3G, FIGS. 4A-4G, and FIGS. 5A-5G, respectively) depict various coupling forces that may be experienced by a vehicle system under various conditions and control schemes.

FIGS. 3A-3G depict coupling forces within a vehicle system 300 in accordance with an embodiment. The vehicle system 300 traverses a terrain 302 shown in FIG. 3A. In the embodiment depicted in FIG. 3, the consists of the vehicle system 300 are operated synchronously, with the powered units of each consist traveling using tractive efforts corresponding to an identical speed. As such, there are thus no coupling forces between the consists when the vehicle system 300 traverses a steady grade. In FIGS. 3-5, tensile coupling forces are depicted as positive forces, and compression coupling forces are depicted as negative forces. For clarity and ease of depiction and explanation each consist of the vehicle system 300 depicted in FIG. 3 includes a lead powered unit and 49 trailing non-powered units for a total length of 50 units, with the horizontal axis in FIGS. 3-5 measured by unit length.

Figure 3A:
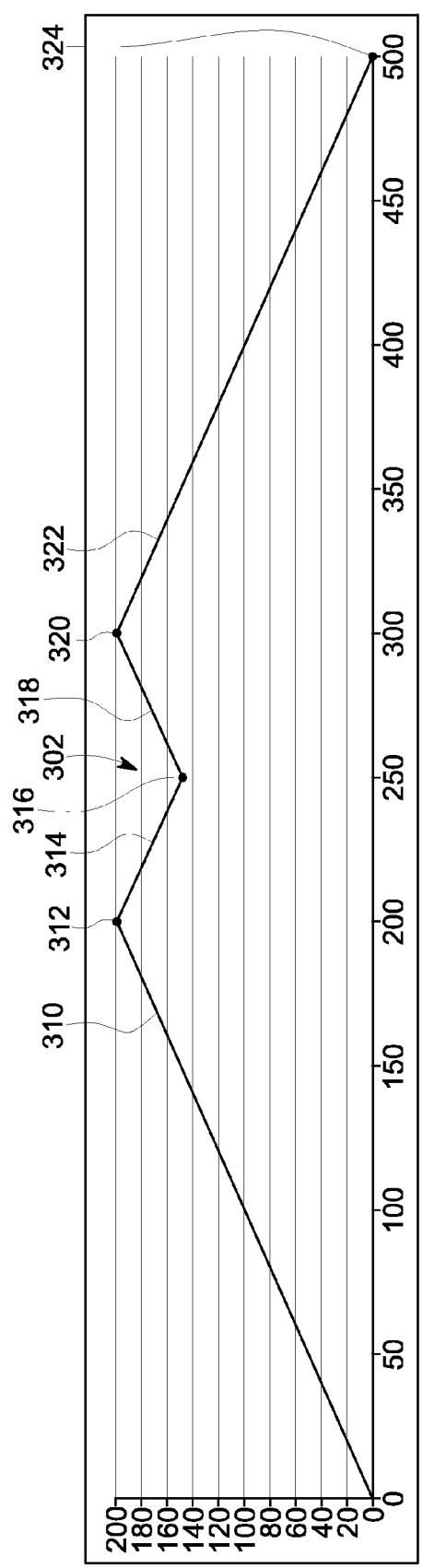

FIG. 3A depicts a terrain 302 traversed by the vehicle system 300. The terrain 302 is depicted in two dimensions for the sake of simplicity. In practice, the terrain could vary in multiple dimensions. For example, the terrain 302 may include curves in addition to grade variations. The terrain 302 includes a first section 310 having a positive grade or slope extending to first peak 312, a second section 314 having a negative grade extending to a first bottom 316, a third section 318 having a positive grade extending to a second peak 320, and a fourth section 322 having a negative grade extending to a second bottom 324.

Figure 3B:
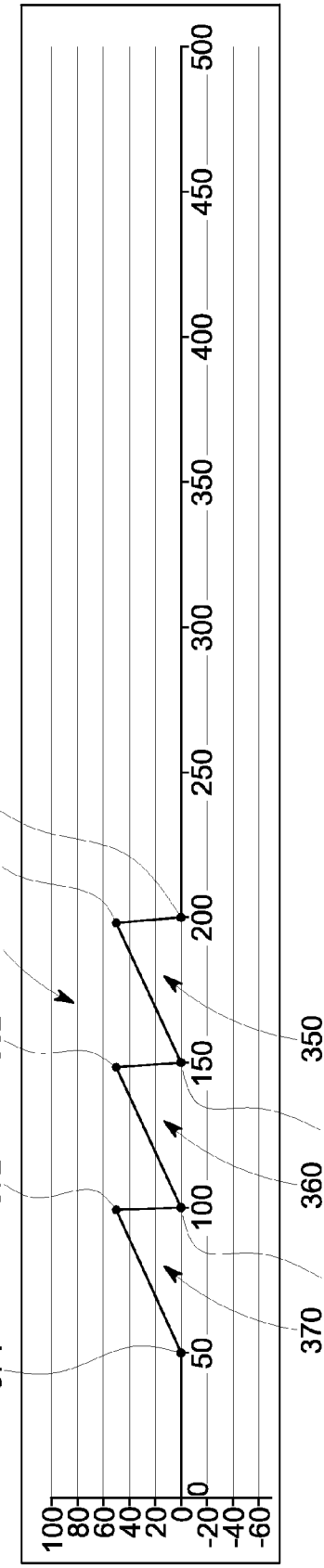

FIG. 3B depicts coupling forces as the vehicle system 300 traverses the first section 310. The first section 310 has a constant grade, so the coupling force between adjacent consists being operated synchronously is about zero. As depicted in FIGS. 3-5, the vehicle system includes a first consist 350, second consist 360, and third consist 370. Point 351 indicates the beginning of first consist (where the force will always be zero) and point 352 corresponds to a coupling force between the lead powered unit and the first trailing unit of the first consist 350. Point 361 indicates the junction between first consist 350 and second consist 360 with point 362 corresponding to a coupling force between the lead powered unit and the first trailing unit of the second consist 360. Point 371 indicates the junction between the second consist 360 and third consist 370 with point 372 corresponding to a coupling force between the lead powered unit and the first trailing unit of the third consist 370, and point 374 is end of third consist. As there is no unit trailing behind point 374, the coupling force at 374 will always be zero. In FIG. 3B, with the entire vehicle system 300 traversing the constant grade first section 310 and the powered units operating synchronously, the coupling forces at the junctures 361, 371 between the various consists is zero. The maximum coupling forces are tensile forces immediately behind the lead powered units of the consists (locations 352, 362, 372) as the lead powered unit is pulling the non-powered units up the grade of the first section 310.

Figure 3C:
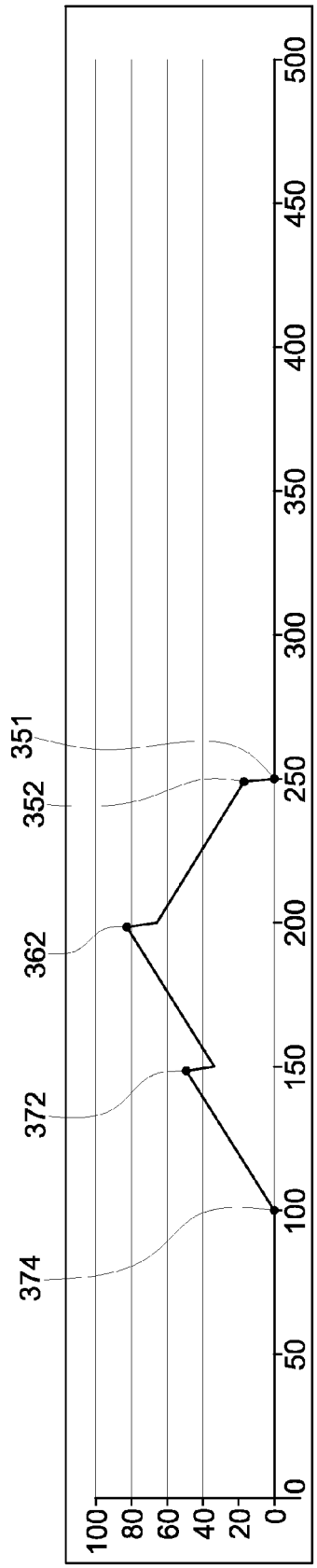

As depicted in FIG. 3C, the first consist 350 has crested the grade of the first section 310, and has passed the first peak 312 and arrived at the first bottom 316 (with the first consist 350 positioned along the second section 314, while the second and third consists 360, 370 are still traversing the first section 310). To maintain a generally constant speed corresponding to the speed of the vehicle system 300 depicted in FIG. 3B, a tractive effort of the first consist 350 may be reduced and/or a braking effort of the first consist 350 may be increased. The coupling force at 352 is reduced due to the effect of the units of the first consist 350 being urged by gravity against the lead powered unit of the first consist 350 as the first consist 350 traverses the negative grade of the second section 314, but is still positive due to tension caused by the trailing consists 360, 370 being pulled up the grade of the first section 310. The tensile force reaches a maximum at point 362 (which is located at the first peak 312 in FIG. 3C) as gravity is causing the consists on either side of the first peak 312 to exert tensile forces at point 362. Forces in the third consist 370 are tensile (positive) as the third consist is being pulled up the grade of the first section 310.

Figure 3D:
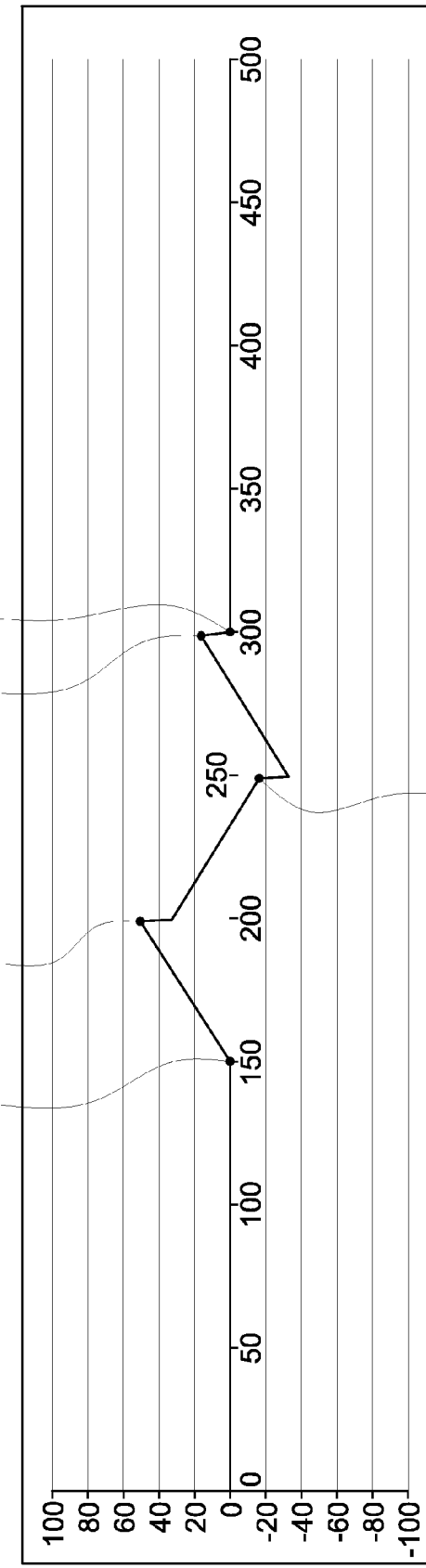

FIG. 3D depicts coupling forces as the first consist travels up the grade of the third section 318 to the second peak 320, the second consist travels down the grade of the second section 314 to the first bottom 316, and the third consist travels up the grade of the first section 310 to the first peak 312. The coupling force at 352 is slightly positive as the lead powered unit of the first consist 350 is pulling the non-powered units of the first consist 350 up the grade of the third section 318, but lower than the coupling force at 352 in FIG. 3B, as the second consist 360 is providing compression (negative in the sense of FIG. 3D) force to the first consist 350. Thus, a portion of the first consist 350 experiences a tensile force and a portion of the first consist 350 experiences a compression force as depicted in FIG. 3D. The second consist 360, on the other hand, experiences a compression force at 362, but steadily increasing (e.g., changing from compression to tensile) forces along the length of the second consist 360) as the third consist 370 exerts a tensile force on the second consist 360 as the third consist 370 traverses the positive grade of the first section 310.

In FIG. 3E, the first consist 350 is traversing down the grade of the fourth section 320 toward the second bottom 322, the second consist 360 is traversing up the grade of the third section 318 toward the second peak 320, and the third consist is traversing down the grade of the second section 314 toward the first bottom 316. At point 352, the compression forces provided by the units of the first consist 350 being urged down the grade of the fourth section 322 (as well as compression forces provided by the third consist being urged down the second section 314) by gravity are slightly greater than tensile forces caused by the presence of the second consist 360 on the positive grade of the third section 318, so the coupling force at 352 is negative (e.g., compression forces are present). The tensile force becomes greater along the length of the first consist, eventually reaching a maximum proximate the end of the first consist 350. The tensile forces reduce and eventually the coupling force becomes a compression force reaching a maximum absolute value at 372, as the travel of the third consist down the grade of the second section 314 exerts a compression force.

In FIG. 3F, the first consist 350 and the second consist 360 are traversing down the grade of the fourth section 320 toward the second bottom 322, and the third consist 370 is traversing up the grade of the third section 318 toward the second peak 320. At point 352, the compression forces provided by the units of the first consist 350 and the second consist 360 being urged down the grade of the fourth section 322 by gravity are slightly greater than tensile forces caused by the presence of the third consist 370 on the positive grade of the third section 318 (e.g., being urged by gravity away from the first and second consists 350, 360), so the coupling force at 352 is negative (e.g., compression forces are present). The tensile force becomes greater along the length of the first consist 350, and still greater along the length of the second consist 360, eventually reaching a maximum proximate the end of the second consist 360.

Figure 3G:
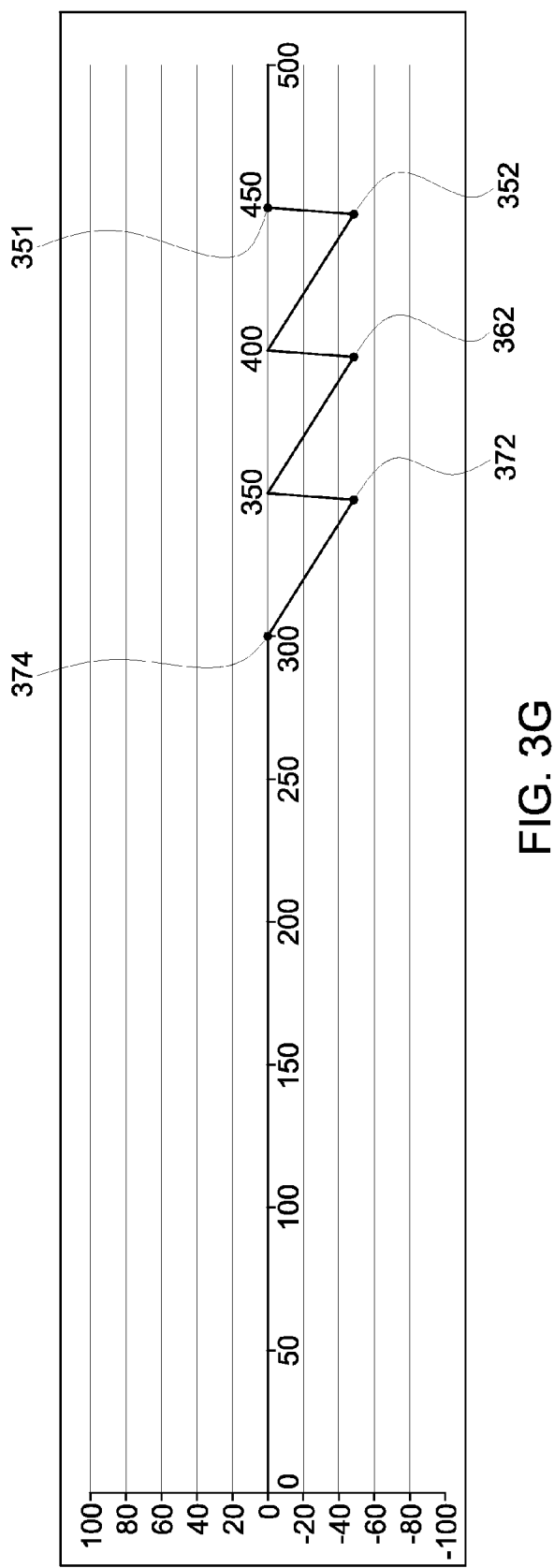

In FIG. 3G, each of the consists 350, 360, 370 are traversing down the constant grade of the fourth section 322. As the consists are being operated synchronously, the coupling force between each consist is zero, and a maximum compression force is experienced between the lead powered unit and the first trailing unit of each consist (at 352, 362, 372).

For the embodiments discussed in connection with FIGS. 4-5, trim adjustments may be made to throttle and/or braking efforts by individual consists to provide or approximate a desired coupling force between consists. Such trim adjustments may be made for a relatively short period of time. Depending on the coupling forces to be addressed, a time adjustment may be made for a duration of a minute or more, or may be made for less than a second. Generally speaking, the consists are operated to perform at generally the same speed as other consists over the duration of a mission, but may make trim adjustments to operate at slightly different speeds than other consists for relatively short durations.

FIGS. 4A-4G depict coupling forces within the vehicle system 300 in accordance with an embodiment. In FIGS. 4A-4G, the vehicle system 300 traverses the terrain 302 shown in FIG. 3A (reproduced for convenience of illustration in FIG. 4A). In the embodiment depicted in FIGS. 4A-4G, the consists of the vehicle system 300 are operated asynchronously, so that the powered units of each consist need not produce at all times tractive efforts corresponding to the same speed. For example, the tractive effort of each consist may be altered or modified from a tractive effort based on a received reference speed to change a coupling force experienced by the consist. In the embodiment of FIGS. 4A-4G, each remote consist (e.g., second consist 360 and third consist 370) independently adjusts its tractive effort so that the coupling force between the consist and the immediately preceding consist is about zero. For example, a consist may monitor a coupling force by inferring or calculating a theoretical coupling force (e.g., resulting from a difference in grades being traversed by adjacent consists) or using a coupling force detector, and adjust its tractive effort based on the coupling force (e.g., increasing its speed when the coupling force with a preceding consist is tensile and decreasing its speed when the coupling force with preceding consist is compressive). Even if the coupling forces are not known, if the tractive effort is regulated based on the speed required along with grade and consist information, the coupling forces can be regulated. To the extent there is any error in the information or the resulting calculation, an actual coupling force will deviate from a desired coupling force by an amount corresponding to the error. For example, if the vehicle system 300 is controlled to eliminate coupling forces between consists, the actual coupling forces between consists will correspond to the error in the estimation of the grade and/or consist information.

Figure 4A:
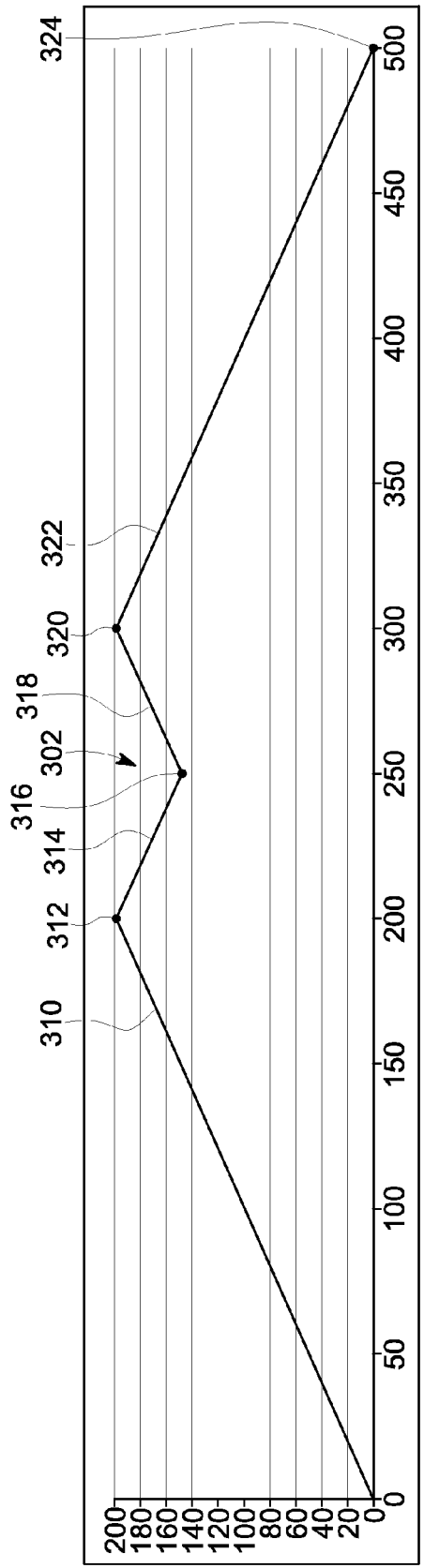
Figure 4B:
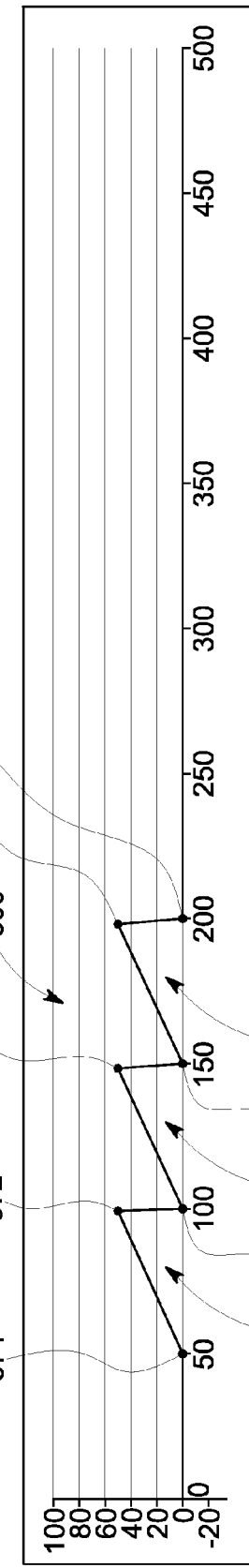

FIG. 4B depicts coupling forces as the vehicle system 300 traverses the first section 310. As the first section 310 has a constant grade, to accomplish zero coupling forces between the consists, the vehicle system 300 will operate approximately similar to the synchronous operation as in FIG. 3B when the entire vehicle system is located along the first section 310 of the terrain 302.

Figure 4C:
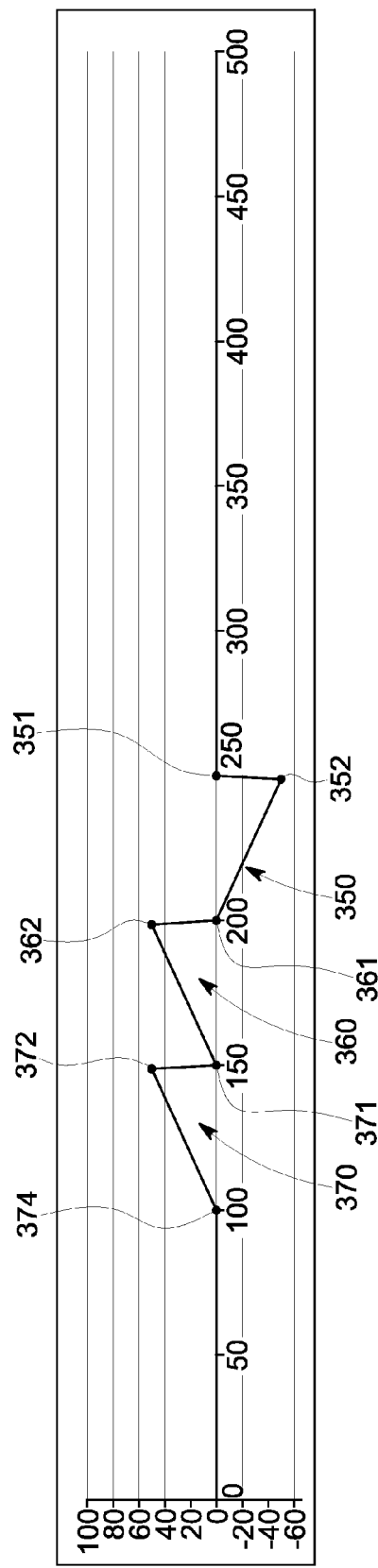

As depicted in FIG. 4C, the first consist 350 has crested the grade of the first section 310 and passed the first peak 312 and arrived at the first bottom 316 (with the first consist 350 positioned along the second section 314), while the second and third consists 360, 370 are still traversing the first section

310. Referring to the embodiment depicted in FIG. 3, at the corresponding position indicated in FIG. 3C, there is a tensile force between the first and second consists, as the first and second consists are on opposite sides of the first peak 312. In contrast, in the embodiment depicted in FIG. 4C, the second consist 360 may be operated at a higher tractive effort than the first consist 350 to counteract (e.g., reduce or eliminate) the tension that would occur between the consists 350, 360 if operated synchronously. In the illustrated embodiment of FIG. 4C, the vehicle system is operated to eliminate the coupling force between consists. In FIG. 4C, there is a maximum compressive force between the lead powered unit and the first trailing unit of the first consist (at 352) and a maximum tension force between the lead powered units and the first trailing units of the second and third consists (at 372). A determination module disposed onboard the second consist 360 may receive a reference speed from the first consist 350, infer, calculate, detect, or otherwise determine an actual or theoretical resulting tensile coupling force (due, for example, to the presence of the consists 350, 360, on opposite sides of the first peak 312), and determine a modified tractive effort corresponding to a modified reference speed (e.g. a slightly higher rate of speed than the reference speed at which the first consist 350 is traveling) at which the second consist 360 may be operated to eliminate the tensile force. As also discussed above, the adjustment to the tractive effort (or corresponding reference speed) may be a trim adjustment of a relatively small magnitude made for a relatively short period of time. Because the second and third consists 350, 360 are both traversing the generally constant grade of the first section 310, the second and third consists 350, 360 may be operated synchronously (e.g., the third consist 360 operating at a tractive effort corresponding to a reference speed provided by the second consist 350).

Figure 4D:
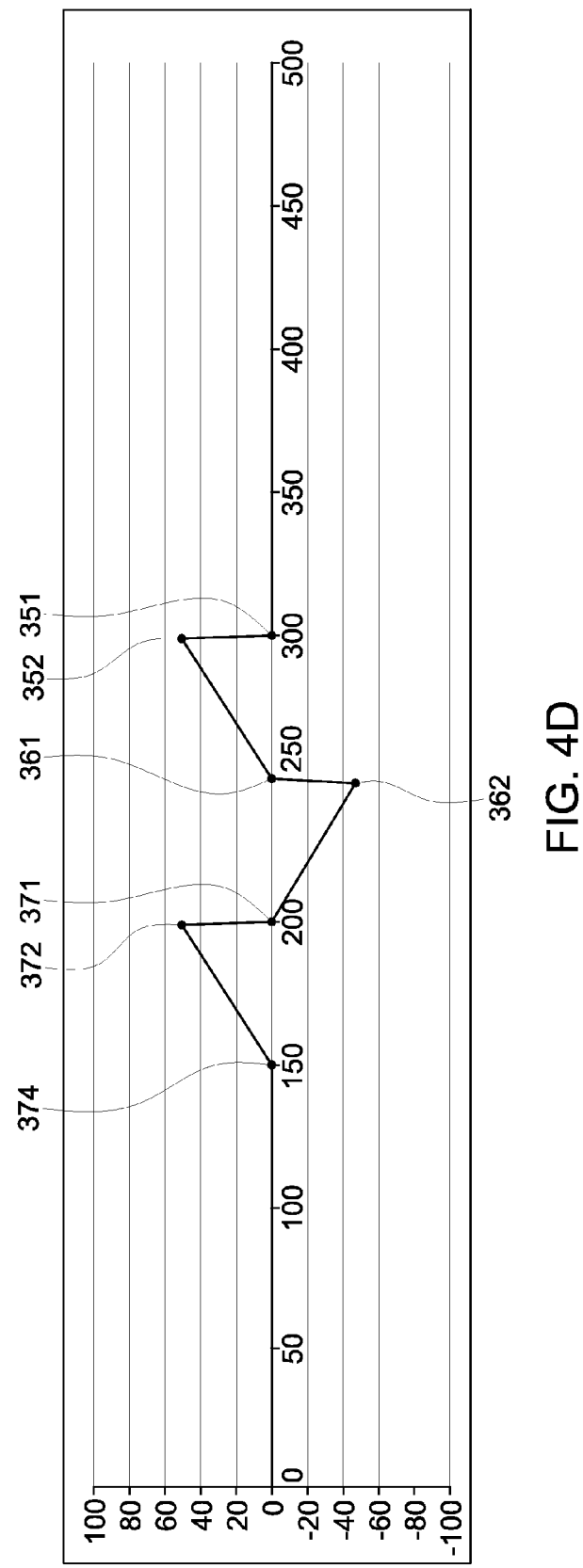
Figure 4G:
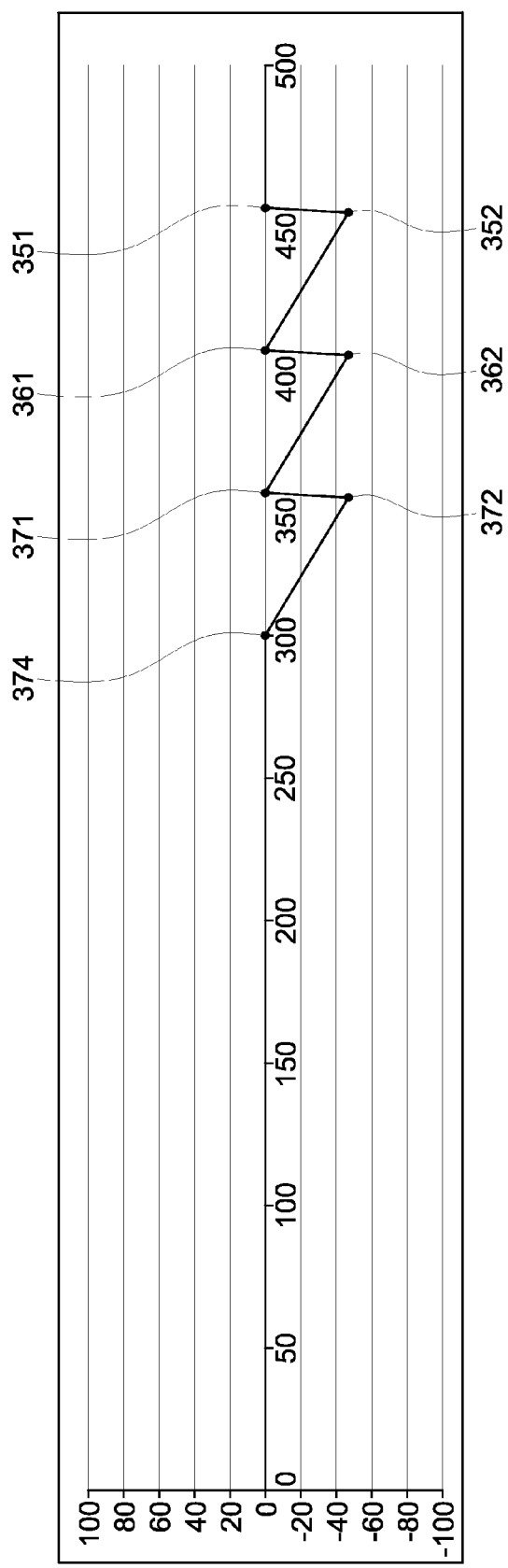

FIGS. 4D-4F illustrate coupling forces along the length of the vehicle system 300 corresponding to respective positions depicted in FIGS. 3D-3F, but with the consists operated so that the coupling forces between consists is zero. Generally speaking, if a trailing consist detects or otherwise determines a positive (tensile) force between itself (the trailing consist) and a leading consist, the trailing consist may modify a reference speed provided by the leading consist used to determine a corresponding tractive or braking effort to increase the speed of the trailing consist. Similarly, generally speaking, if a trailing consist detects a negative (tensile) force between itself (the trailing consist) and a leading consist, the trailing consist may modify a reference speed provided by the leading consist used to determine a corresponding tractive or braking effort to decrease the speed of the trailing consist. The decreased reference speed may be accomplished, for example, by decreasing a throttle setting or increasing a braking effort. As seen in FIGS. 4A-4G, a maximum amplitude of coupling force (either tensile or compression) may be reduced by operating a vehicle system asynchronously when compared to the synchronous operation of FIGS. 3A-3G.

The coupling force need not necessarily be controlled to be at or near zero between adjacent consists. For example, an actual coupling force may be present due to errors in the estimation or calculation of an inferred coupling force. As another example, a consist may be operated to experience a coupling force that may be used advantageously, while still limiting the amount of the coupling force. For example, when a leading consist has crested a hill, some tensile force may be advantageous to help pull a trailing consist up the grade recently passed by the leading consist. Similarly, when a trailing consist is traversing down a grade and being urged forward by gravity, some compression force between the trailing consist and a leading consist may be beneficial to allow the trailing consist to push the leading consist. Thus, in some embodiments, the various consists of the vehicle system 300 may be controlled to provide a beneficial coupling force while still maintaining coupling forces below a desired maximum or within a preferred range. FIGS. 5A-5G depict coupling forces within the vehicle system 300 in accordance with an embodiment. While in the below discussion the coupling forces are addressed in the context of intended coupling forces, the depicted coupling forces may in alternate embodiments be the result of an error in an estimated or inferred coupling force (e.g., as a result of a deviation of one or more actual grades (or other parameter) from an estimated value).

Figure 5C:
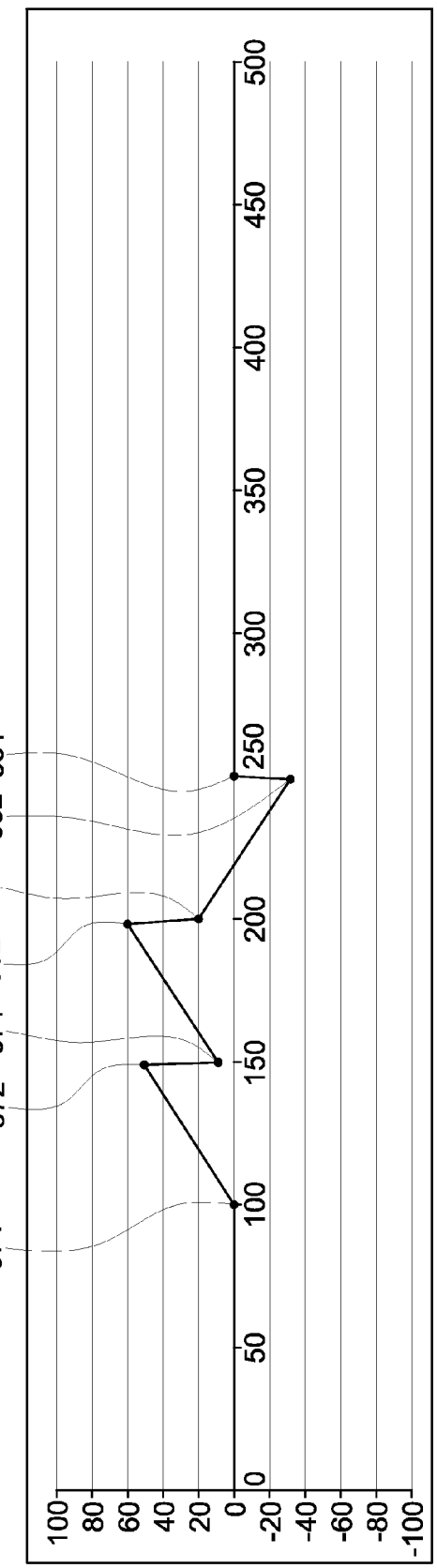
Figure 5D:
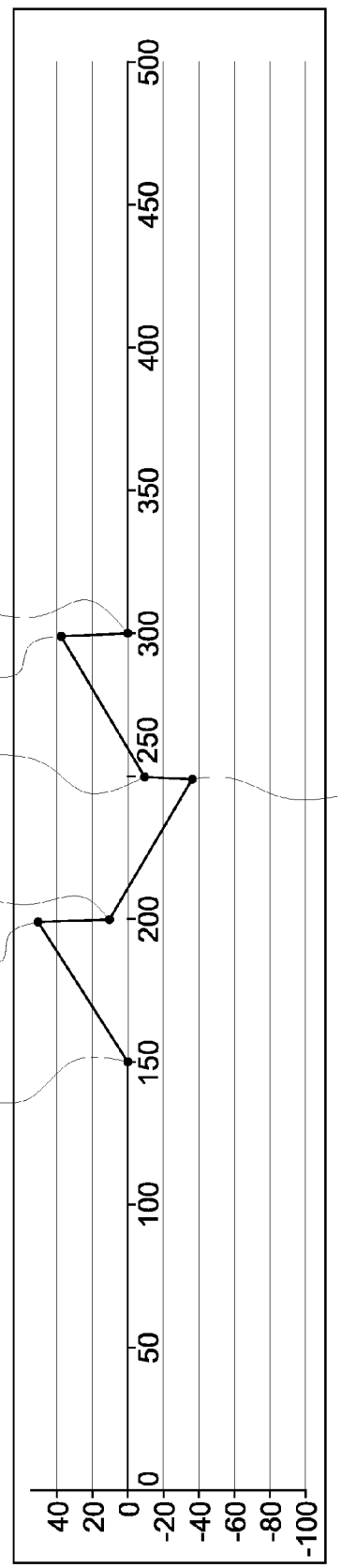
Figure 5E:
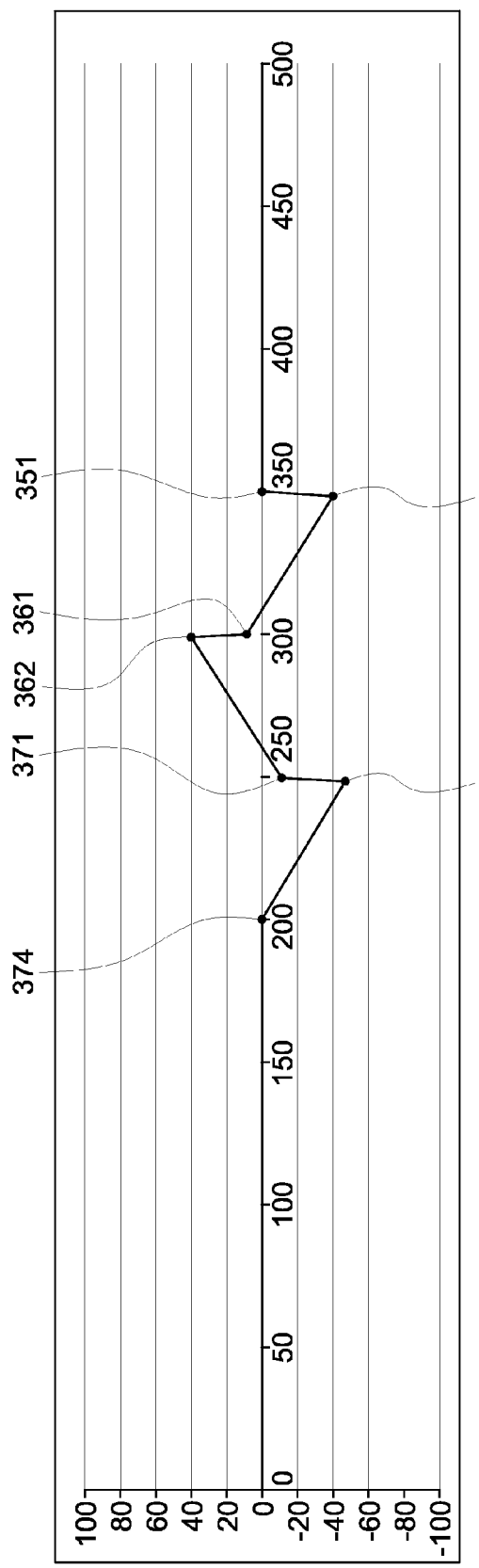
Figure 5F:
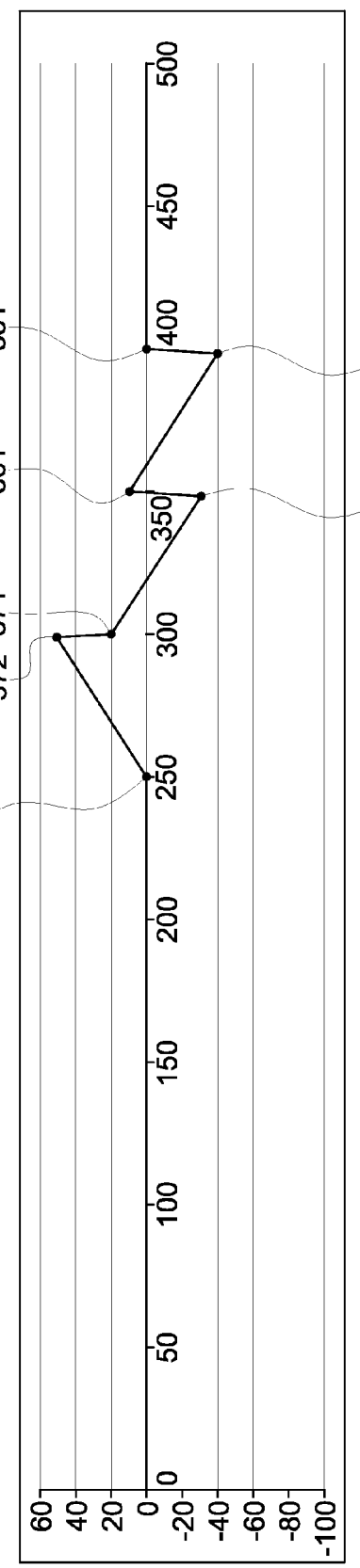
Figure 5G:
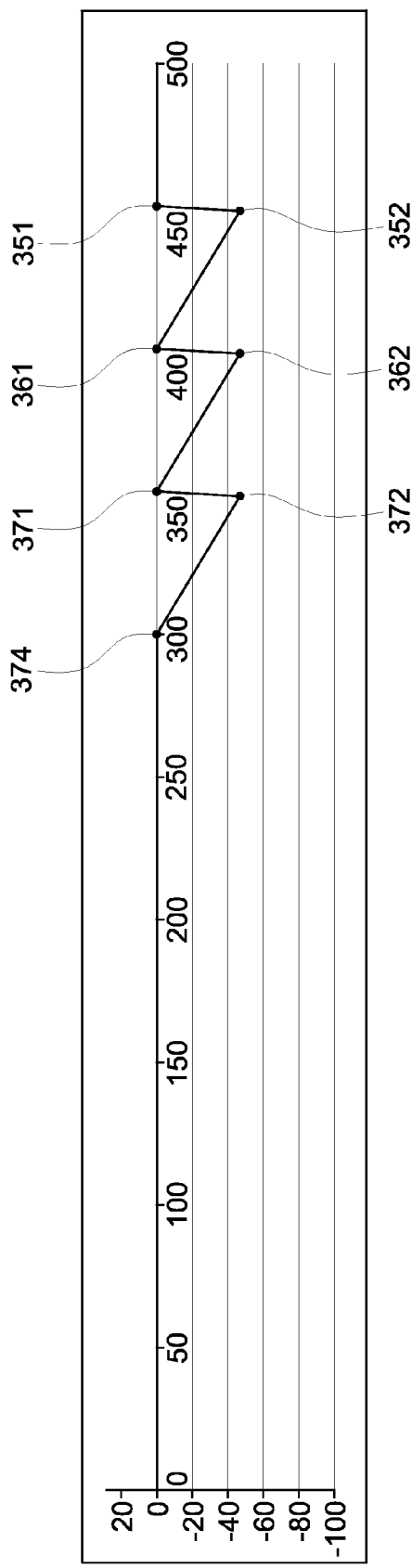

In FIGS. 5A-5G, the vehicle system 300 traverses the terrain 302 shown in FIGS. 3A and 4A, and reproduced for convenience in FIG. 5A. In the embodiment depicted in FIGS. 5A-5G, the consists of the vehicle system 300 are operated asynchronously, so that the powered units of each consist need not travel at the same reference speed, with the coupling force between consists allowed to be non-zero but maintained within a range to provide reduced coupling forces when compared to synchronous operation (e.g., as depicted in FIGS. 3A-3G). For example, in FIG. 5C, the lead consist may be operated with reduced braking effort compared to the braking effort required to eliminate the coupling force between the first and second consists. Thus, the force of gravity urging the first consist down the grade of the second section 314 may be used to some extent to help pull the second consist up the grade of the first section 310, while still allowing control or reduction of the tension forces between the consists when compared to synchronous operation.

Figure 6A:
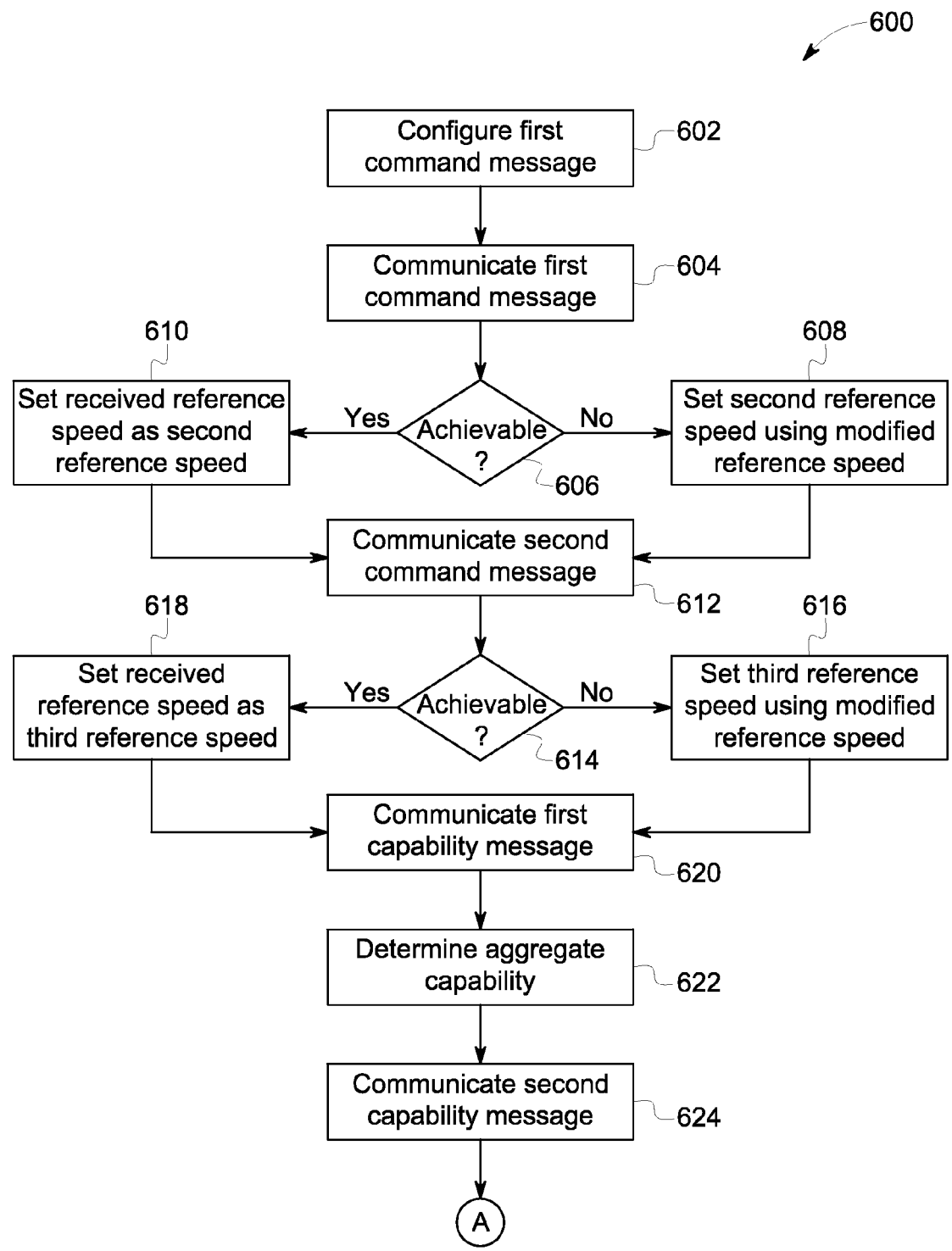
FIG. 6A and FIG. 6B, illustrates a flowchart of a method for controlling a vehicle system in accordance with one embodiment.
Figure 6B:
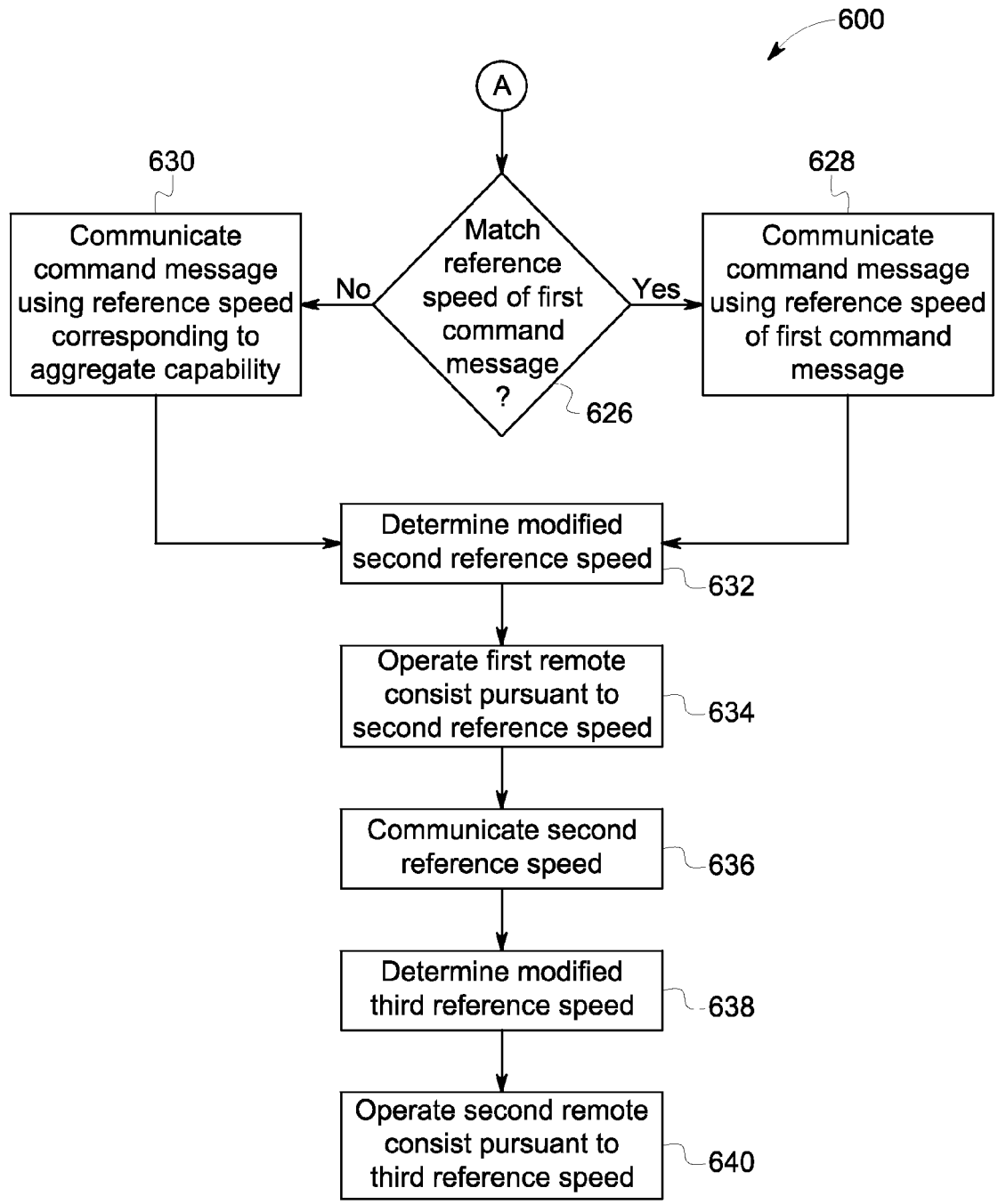

FIG. 6, comprising parts FIGS. 6A and 6B, illustrates a flowchart of a method 600 (e.g., for communication and control of various consists of a vehicle system) in accordance with one embodiment. The method 600 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. The method 600 is described in the context of a vehicle system having a lead consist and first and second remote consists. In various embodiments, the general principles and concepts depicted by the example method 600 may be applied to vehicle systems having different numbers or arrangements of consists.

At 602, a first command message is configured. The first command message may be configured, for example, at a control module of a lead powered unit of a lead consist, and may be determined pursuant to a trip plan. The first command message, in some embodiments, includes information describing or otherwise corresponding to a tractive and/or braking effort to be performed by one or more remote consists of the vehicle system. For example, the first command message may include information corresponding to a first reference speed at which the lead consist will operate.

At 604, the first command message is communicated from the lead consist to a first remote consist of the vehicle system. The first remote consist, for example, may be the remote consist positioned nearest to the lead consist. In some embodiments, the first command message may be communicated to the first remote consist and not to any other remote consists.

At 606, it is determined if the reference speed specified by the first command message may be achieved by the first remote consist. The determination may be made, for example, by a determination module disposed onboard the first remote consist (e.g., a lead powered unit of the first remote consist). If the first remote consist is not able to achieve the reference speed, a modified reference speed at which the first remote consist may operate is determined at 608, and a second reference speed is set as the modified reference speed. If the first remote consist is able to achieve the reference speed, then the received reference speed is set as the second reference speed at 610.

At 612, a second command message is communicated from the first remote consist to a second remote consist of the vehicle system. The second remote consist, for example, may be the remote consist positioned nearest to the first remote consist. In some embodiments, the second command message may be communicated to the second remote consist and not to any other remote consists.

At 614, it is determined if the reference speed specified by the second command message may be achieved by the second remote consist. The determination may be made, for example, by a determination module disposed onboard the second remote consist (e.g., a lead powered unit of the second remote consist). If the second remote consist is not able to achieve the reference speed, a modified reference speed at which the second remote consist may operate is determined at 616, and a third reference speed is set as the modified reference speed. If the second remote consist is able to achieve the reference speed, then the reference speed received at 612 is set as the third reference speed at 618.

At 620, a first capability message including the third reference speed is communicated from the second remote consist to the first remote consist. At 622, the first remote consist (e.g., a determination module disposed onboard the first remote consist) determines an aggregate capability corresponding to the lowest reference speed reported as achievable by any remote consist of the vehicle system. At 624, a second capability message including the aggregate capability is communicated to the lead consist.

At 626, the lead consist (e.g., a control module disposed onboard the lead powered unit of the lead consist) determines if the aggregate capability matches the reference speed included as part of the first command message at 602. If the aggregate capability matches the reference speed, then a command message including the first reference speed may be communicated to the first remote consist at 628. If the aggregate capability does not match the reference speed included as part of the first command message, then a first reference speed corresponding to the aggregate capability (e.g., a reduced reference speed compared to the reference speed included as part of the first command message at 602) may be communicated to the first remote consist at 630. Further, a trip plan including a reference speed originally communicated at 604 may be modified to reflect the use of first reference speed corresponding to the aggregate capability.

At 632, the first remote consist (e.g., a determination module disposed onboard a lead powered unit of the first remote consist) determines a modified second reference speed at which the first remote consist will be operated and adjusts the received first reference speed to reflect the modification of the reference speed. For example, the second reference speed may be modified from the first reference speed to account for coupling information indicating a coupling force between the lead consist and the first remote consist. At 634, the first remote consist is operated pursuant to the second reference speed, and, at 636, the second reference speed is communicated to the second remote consist.

At 638, the second remote consist (e.g., a determination module disposed onboard a lead powered unit of the second remote consist) adjusts the received second reference speed to determine a modified third reference speed at which the second remote consist will be operated. For example, the third reference speed may be modified from the second reference speed to account for coupling information indicating a coupling force between the first and second remote consists. At 640, the second remote consist is operated pursuant to the third reference speed.

Thus, embodiments provide improved fine tuning and individualization of control commands for one or more consists of a vehicle system. Embodiments also provide improved haulageability, for example, by enabling longer vehicle systems or vehicle systems with more consists. Further, some embodiments may provide reduced drawbar forces or improved control of coupling forces. Further still, embodiments provide improved adhesion or train handling.

In one embodiment, a system is provided that includes a remote communication module, a control module, and a determination module. The remote communication module is configured to be disposed onboard a remote consist of a vehicle system, and is communicatively connected to at least one additional consist of the vehicle system. The control module is configured to be disposed onboard the remote consist and to provide control commands to at least one powered unit of the remote consist. The determination module is configured to be disposed onboard the remote consist and to determine capability information corresponding to the ability of the at least one powered unit of the remote consist to perform a first command received from one of the at least one additional consist. The determination module is also configured to determine a second command provided to the control module using the first command and the capability information, wherein the control module is configured to use the second command to control the at least one powered unit of the remote consist.

In another aspect, the remote communication module may be configured to communicate with immediately neighboring consists, but not with non-immediately neighboring consists.

In another aspect, the remote communication module may be configured to communicate the capability information to the at least one additional consist of the vehicle system.

In another aspect, the capability information may include information corresponding to an aggregate capability of plural consists.

In another aspect, the determination module may be configured to utilize at least one of terrain information or coupling information to determine the second command. In some embodiments, the coupling information may include force information corresponding to a force between coupled units of the vehicle system. In some embodiments, the coupling information may include distance information corresponding to a distance between coupled units of the vehicle system.

In another aspect, the first consist may be configured as a lead consist and the second consist and plural other consists configured as remote consists. The plural other consists may include corresponding communication modules and determination modules, wherein the communication module of the lead consist is configured to communicate a reference speed to at least one of a consist immediately preceding the lead consist or a consist immediately following the lead consist. Further, the communication module of the at least one of the consist immediately preceding the lead consist or the consist immediately following the lead consist may be configured to communicate the reference speed to an immediately neighboring remote consist.

In another aspect, the first and second communication modules are communicatively connected via a hard-wired link.

In another embodiment, a system includes a first communication module, a second communication module, a first control module, a second control module, and a determination module. The first communication module is configured to be disposed onboard a first consist of a vehicle system. The first control module is configured to be disposed onboard the first consist and to determine a first command. The second communication module is configured to be disposed onboard a second consist of a vehicle system. The second communication module is communicatively connected to the first communication module and configured to receive the first command from the first consist. The second control module is configured to be disposed onboard the second consist and to provide control commands to at least one powered unit of the second consist. The determination module is configured to be disposed onboard the second consist. The determination module is also configured to determine capability information corresponding to the ability of the at least one powered unit of the second consist to perform the first command. The determination module is further configured to determine a second command provided to the second control module using the first command and the capability information, wherein the second control module is configured to use the second command to control the at least one powered unit of the second consist.

In another aspect, the first consist is configured as a lead consist and the second consist is configured as a remote consist. The first and second communication modules are configured to wirelessly communicate with each other. The first control module is configured to determine the first command using trip planning information, and the communications and control system is configured so that the first command is transmitted from the first consist to the second consist but not to at least one other consists of the vehicle system. In some embodiments, the second communication module is configured to communicate with immediately neighboring consists, but not with non-immediately neighboring consists.

In another aspect, the second communication module is configured to communicate the second command to a third communication module disposed onboard a third consist of the vehicle system.

In another aspect, the second communication module is configured to communicate the capability information to the first consist. In some embodiments, the capability information includes information corresponding to an aggregate capability of plural consists.

In another aspect, the determination module is configured to utilize at least one of terrain information or coupling information to determine the second command. In some embodiments, the coupling information may include force information corresponding to a force between coupled units of the vehicle system. In some embodiments, the coupling information may include distance information corresponding to a distance between coupled units of the vehicle system.

In another embodiment, a method (e.g., a method for controlling operations of a vehicle system) is provided that includes determining, at a lead consist, a first command based on a desired operation of a vehicle system. The method also includes communicating the first command from the lead consist to a first remote consist. The first command may be communicated via a lead communication module disposed onboard the lead consist and a remote communication module disposed onboard the first remote consist of the vehicle system. The method also includes determining, at the first remote consist, capability information corresponding to the ability of the remote consist to perform the first command. Also, the method includes determining, at the first remote consist, a second command using the first command and the capability information. Further, the method includes operating the first remote consist pursuant to the second command.

In another aspect, the method includes communicating the second command to a second remote consist of the vehicle system.

In another aspect, the first command is not communicated to the second remote consist.

In another aspect, determining the capability information is performed using capability information from plural remote consists.

In another aspect, the method includes communicating the capability information to the lead consist.

In another aspect, determining the second command is performed using at least one of terrain information or coupling information. In some embodiments, the coupling information may include force information corresponding to a force between coupled units of the vehicle system. In some embodiments, the coupling information may include distance information corresponding to a distance between coupled units of the vehicle system.

In another embodiment, a method (e.g., a method for controlling operations of a vehicle system) is provided that includes determining, at a first remote consist of a vehicle system, capability information. The capability information corresponds to an ability of the remote consist to perform a first command received at the first remote consist from a lead consist of the vehicle system. The first command is determined based on a desired operation of the vehicle system. The method also includes, determining, at the first remote consists, a second command using the first command and the capability information. The method further includes operating the first remote consist pursuant to the second command.

Various components and modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer" or "computing system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. The scope should, therefore, be determined with reference to the appended claims, along with the full scope of equivalents to which such claims are entitled. In the appended claims, the terms "including," "includes," and "in which" are used as the plain-English equivalents of the respective terms "comprising," "comprises," and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments, and also to enable a person of ordinary skill in the art to practice the embodiments, including making and using any devices or systems and performing any incorporated methods. The patentable scope is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for communicating data in a vehicle system or consist, without departing from the spirit and scope of the embodiments described herein, it is intended that all of the subject matter of the above description or shown in the accompanying drawings shall be interpreted merely as examples illustrating the inventive subject matter herein and shall not be construed as limiting.

What is claimed is:

1. A communications and control system comprising:
a first communication module configured to be disposed onboard a first consist of a vehicle system;
a first control module configured to be disposed onboard the first consist, the first control module configured to determine a first command;
a second communication module configured to be disposed onboard a second consist of a vehicle system, the second communication module communicatively connected to the first communication module and configured to receive the first command from the first consist;
a second control module configured to be disposed onboard the second consist, the second control module configured to provide control commands to at least one powered unit of the second consist; and
a determination module configured to be disposed onboard the second consist, the determination module configured to determine capability information corresponding to an ability of the at least one powered unit of the second consist to perform the first command, and to determine a second command provided to the second control module using the first command and the capability information, the second command differing from the first command when the at least one powered unit of the second consist is not capable of performing the first command, wherein the second control module is configured to use the second command to control the at least one powered unit of the second consist.

2. The system of claim 1, wherein the first consist is configured as a lead consist and the second consist is configured as a remote consist, the first and second communication modules are configured to wirelessly communicate with each other, the first control module is configured to determine the first command using trip planning information, and the communications and control system is configured so that the first command is transmitted from the first consist to the second consist but not to at least one other consist of the vehicle system.

3. The system of claim 2, wherein the second communication module is configured to communicate with immediately neighboring consists, but not with non-immediately neighboring consists.

4. The system of claim 1, wherein the second communication module is configured to communicate the second command to a third communication module disposed onboard a third consist of the vehicle system.

5. The system of claim 1, wherein the second communication module is configured to communicate the capability information to the first consist.

6. The system of claim 5, wherein the capability information includes information corresponding to an aggregate capability of plural consists.

7. The system of claim 1, wherein the determination module is configured to utilize at least one of terrain information or coupling information to determine the second command.

8. The system of claim 7, wherein the coupling information includes force information corresponding to a force between coupled units of the vehicle system.

9. The system of claim 7, wherein the coupling information includes distance information corresponding to a distance between coupled units of the vehicle system.

10. The system of claim 1, wherein the first consist is configured as a lead consist and the second consist and plural other consists are configured as remote consists, the plural other consists comprising corresponding communication modules and determination modules, wherein the communication module of the lead consist is configured to communicate a reference speed to at least one of a consist immediately preceding the lead consist or a consist immediately following the lead consist, and wherein the communication module of the at least one of the consist immediately preceding the lead consist or the consist immediately following the lead consist is configured to communicate the reference speed to an immediately neighboring remote consist.

11. The system of claim 1, wherein the first and second communication modules are communicatively connected via a hard-wired link.

12. A method comprising:
   determining, at a lead consist, a first command based on a desired operation of a vehicle system;
   communicating, via a lead communication module disposed onboard the lead consist and a remote communication module disposed onboard a first remote consist of the vehicle system, the first command from the lead consist to the first remote consist;
   determining, at the first remote consist, capability information corresponding to an ability of the first remote consist to perform the first command;
   determining, at the first remote consist, a second command using the first command and the capability information, the second command differing from the first command when the first remote consist is not capable of performing the first command; and
   operating the first remote consist pursuant to the second command.

13. The method of claim 12, further comprising communicating the second command to a second remote consist of the vehicle system.

14. The method of claim 13, wherein the first command is not communicated to the second remote consist.

15. The method of claim 12, wherein the determining the capability information is performed using capability information from plural remote consists.

16. The method of claim 12, further comprising communicating the capability information to the lead consist.

17. The method of claim 12, wherein the determining the second command is performed using at least one of terrain information or coupling information.

18. The method of claim 17, wherein the coupling information includes force information corresponding to a force between coupled units of the vehicle system.

19. The method of claim 17, wherein the coupling information includes distance information corresponding to a distance between coupled units of the vehicle system.

20. A communications and control system comprising:
   a remote communication module configured to be disposed onboard a remote consist of a vehicle system, the remote communication module configured to communicate with at least one additional consist of the vehicle system;
   a control module configured to be disposed onboard the remote consist and to provide control commands to at least one powered unit of the remote consist; and
   a determination module configured to be disposed onboard the remote consist and to determine capability information corresponding to an ability of the at least one powered unit of the remote consist to perform a first command received from one of the at least one additional consist, and to determine a second command provided to the control module using the first command and the capability information, the second command differing from the first command when the at least one powered unit of the remote consist is not capable of performing the first command, wherein the control module is configured to use the second command to control the at least one powered unit of the remote consist.

21. The system of claim 20, wherein the remote communication module is configured to communicate with immediately neighboring consists, but not with non-immediately neighboring consists.

22. The system of claim 20, wherein the remote communication module is configured to communicate the capability information to the at least one additional consist of the vehicle system.

23. The system of claim 20, wherein the capability information includes information corresponding to an aggregate capability of plural consists.

24. The system of claim 20, wherein the determination module is configured to utilize at least one of terrain information or coupling information to determine the second command.

25. The system of claim 24, wherein the coupling information includes force information corresponding to a force between coupled units of the vehicle system.

26. The system of claim 24, wherein the coupling information includes distance information corresponding to a distance between coupled units of the vehicle system.

27. A method comprising:
   determining, at a first remote consist of a vehicle system, capability information corresponding to an ability of the first remote consist to perform a first command received at the first remote consist from a lead consist of the vehicle system, the first command determined based on a desired operation of the vehicle system;
   determining, at the first remote consist, a second command using the first command and the capability information, the second command differing from the first command when the first remote consist is not capable of performing the first command; and
   operating the first remote consist pursuant to the second command.

28. The system of claim 1, wherein the capability information corresponds to an ability of the at least one powered unit of the second consist to achieve a first speed specified by the first command.

29. The system of claim 28, wherein the second command corresponds to a second speed that is lower than the first speed, wherein the second communication module is configured to communicate the second command to the first consist.

30. The system of claim 29, wherein the second communication module is configured to communicate the second command to an additional remote consist.

* * * * *